US012238247B2

(12) United States Patent
Kannan et al.

(10) Patent No.: US 12,238,247 B2
(45) Date of Patent: Feb. 25, 2025

(54) SYSTEM AND METHOD FOR RECONNECTING AN INBOUND ORIGINATED CALL

(71) Applicant: InContact Inc., Salt Lake City, UT (US)

(72) Inventors: Sudarshan Kannan, Pune (IN); Dhanendra Singh, Pune (IN); Ganesh Hegde, Bluffdale, UT (US)

(73) Assignee: InContact Inc., Salt Lake City, UT (US)

( * ) Notice: Subject to any disclaimer, the term of this patent is extended or adjusted under 35 U.S.C. 154(b) by 0 days.

(21) Appl. No.: 18/096,265

(22) Filed: Jan. 12, 2023

(65) Prior Publication Data
US 2024/0244138 A1 Jul. 18, 2024

(51) Int. Cl.
*H04M 7/00* (2006.01)
*H04M 3/00* (2024.01)
*H04M 3/523* (2006.01)

(52) U.S. Cl.
CPC .. *H04M 3/5231* (2013.01); *H04M 2203/2088* (2013.01)

(58) Field of Classification Search
CPC .............. H04M 3/5231; H04M 2203/2088
USPC ............ 379/210.01, 211.01, 220.01
See application file for complete search history.

(56) References Cited

U.S. PATENT DOCUMENTS

| | | | | |
|---|---|---|---|---|
| 5,341,412 A * | 8/1994 | Ramot | ........... | H04M 3/523 379/904 |
| 5,737,405 A * | 4/1998 | Dezonno | ........... | H04M 3/51 379/189 |
| 5,943,416 A * | 8/1999 | Gisby | ........... | H04M 3/51 379/92.03 |
| 6,215,782 B1 | 4/2001 | Buskens et al. | | |
| 6,314,175 B1 * | 11/2001 | Jones | ........... | H04M 3/51 379/228 |
| 7,130,619 B2 | 10/2006 | Florkey et al. | | |
| 7,228,145 B2 * | 6/2007 | Burritt | ........... | H04W 4/24 455/445 |
| 7,688,963 B1 | 3/2010 | Lang et al. | | |
| 7,792,019 B1 * | 9/2010 | Ger | ........... | H04M 3/58 370/401 |
| 8,139,729 B2 * | 3/2012 | Phelps | ........... | H04M 7/1295 379/156 |
| 8,582,750 B2 | 11/2013 | Lee et al. | | |
| 8,755,502 B1 * | 6/2014 | Schlesener | ........... | H04M 3/42 455/445 |
| 9,100,478 B1 * | 8/2015 | Benway | ........... | H04M 3/493 |

(Continued)

FOREIGN PATENT DOCUMENTS

RU 2183908 6/2002

*Primary Examiner* — William J Deane, Jr.
(74) *Attorney, Agent, or Firm* — PEARL COHEN ZEDEK LATZER BARATZ LLP

(57) ABSTRACT

A system and a method for reestablishing an interrupted connection between a first device such as an agent device and second device such as a customer device may include a computing device; a memory, configured to store customer data related to a customer device of a customer, and a processor. Embodiments may include detecting an interrupted connection between an agent device and the customer device; transmitting customer data for the customer device to an outbound system; and reconnecting the agent device to the customer device using the customer data.

20 Claims, 23 Drawing Sheets

(56) References Cited

U.S. PATENT DOCUMENTS

| | | | |
|---|---|---|---|
| 10,135,985 B1 | 11/2018 | Deole et al. | |
| 11,799,920 B1* | 10/2023 | Kammara | H04L 65/1086 |
| 2001/0040887 A1* | 11/2001 | Shtivelman | H04M 3/5237 |
| | | | 370/352 |
| 2004/0235509 A1 | 11/2004 | Burritt et al. | |
| 2005/0070286 A1* | 3/2005 | Awasthi | H04W 76/19 |
| | | | 455/563 |
| 2008/0205608 A1* | 8/2008 | Tal | H04M 3/527 |
| | | | 379/93.01 |
| 2010/0220846 A1* | 9/2010 | Gisby | H04M 3/56 |
| | | | 379/202.01 |
| 2011/0230196 A1* | 9/2011 | Tal | H04M 3/42374 |
| | | | 455/450 |
| 2012/0027194 A1* | 2/2012 | Deshpande | H04M 3/493 |
| | | | 379/265.01 |
| 2014/0270123 A1* | 9/2014 | Stanford | H04M 1/2478 |
| | | | 379/142.17 |
| 2015/0163361 A1 | 6/2015 | George et al. | |
| 2015/0365532 A1* | 12/2015 | Ristock | H04M 7/006 |
| | | | 379/265.09 |
| 2016/0065748 A1* | 3/2016 | Li | H04M 3/42263 |
| | | | 379/45 |
| 2021/0132748 A1* | 5/2021 | Paiva | G06F 3/0482 |
| 2021/0136217 A1* | 5/2021 | Paiva | G10L 15/22 |
| 2023/0060552 A1* | 3/2023 | DiMaria | H04L 47/6275 |
| 2023/0370550 A1* | 11/2023 | Harpley | H04M 3/5231 |

\* cited by examiner

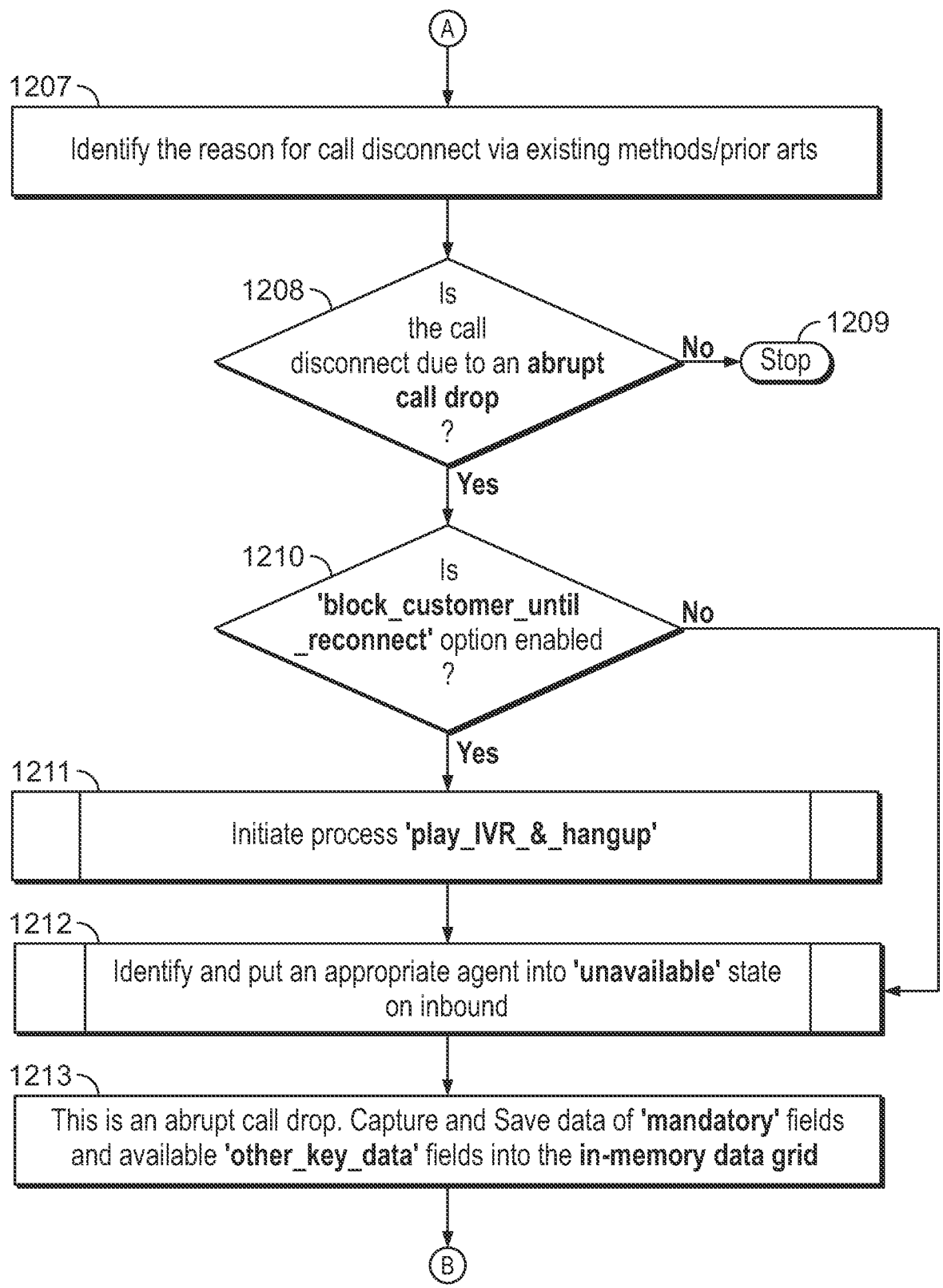
FIG. 12A (Cont. 1)

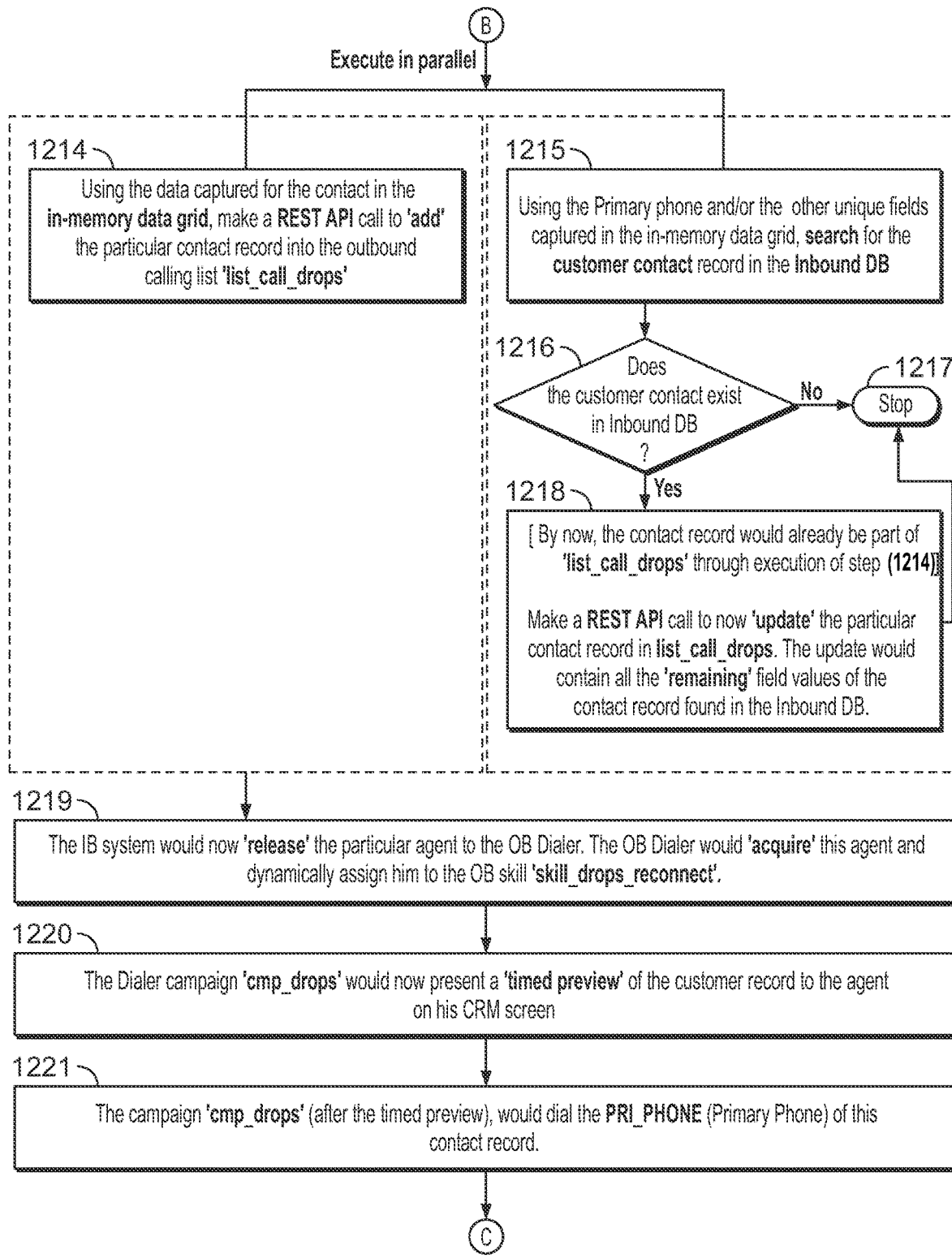
FIG. 12A (Cont. 2)

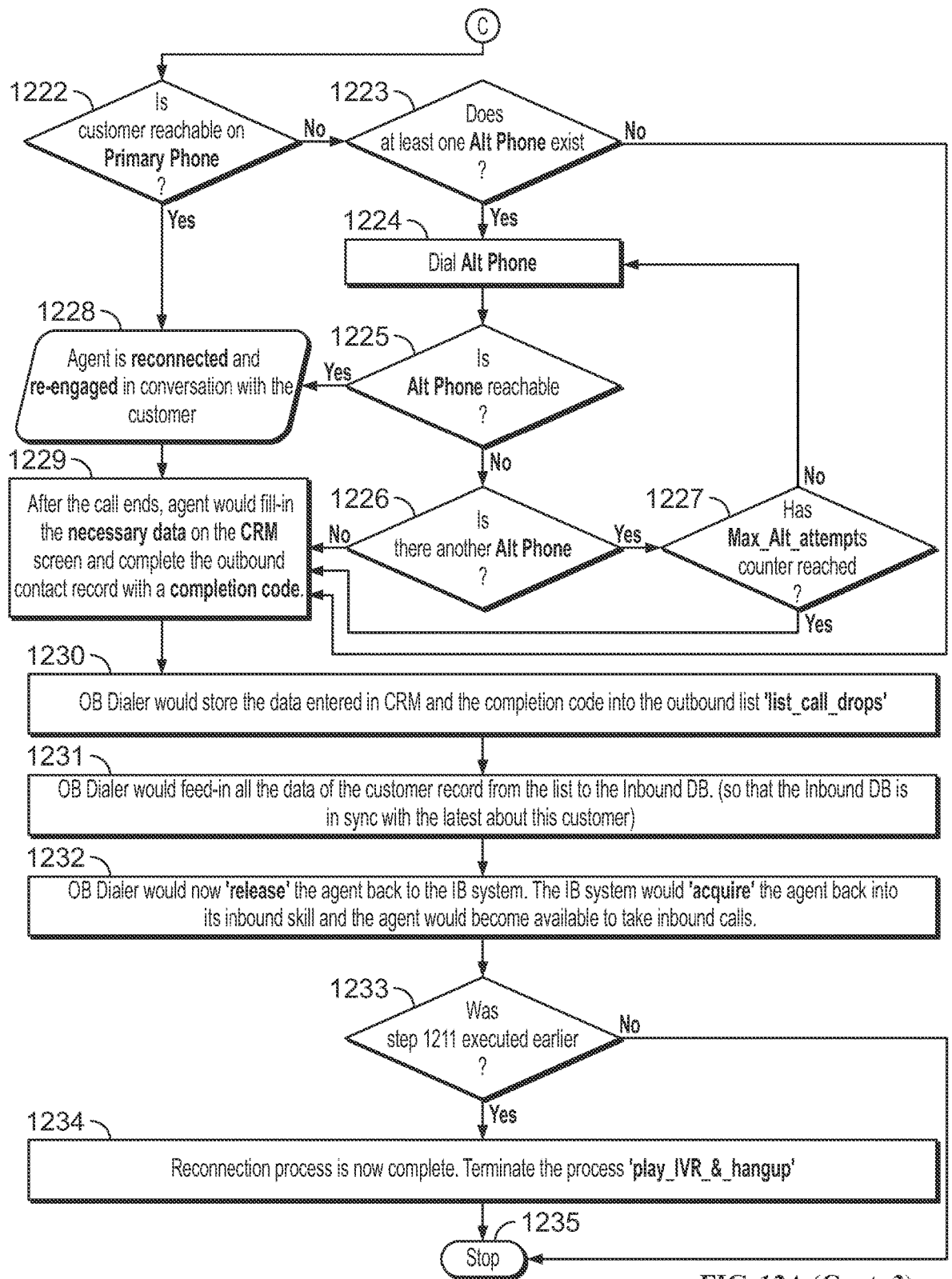
FIG. 12A (Cont. 3)

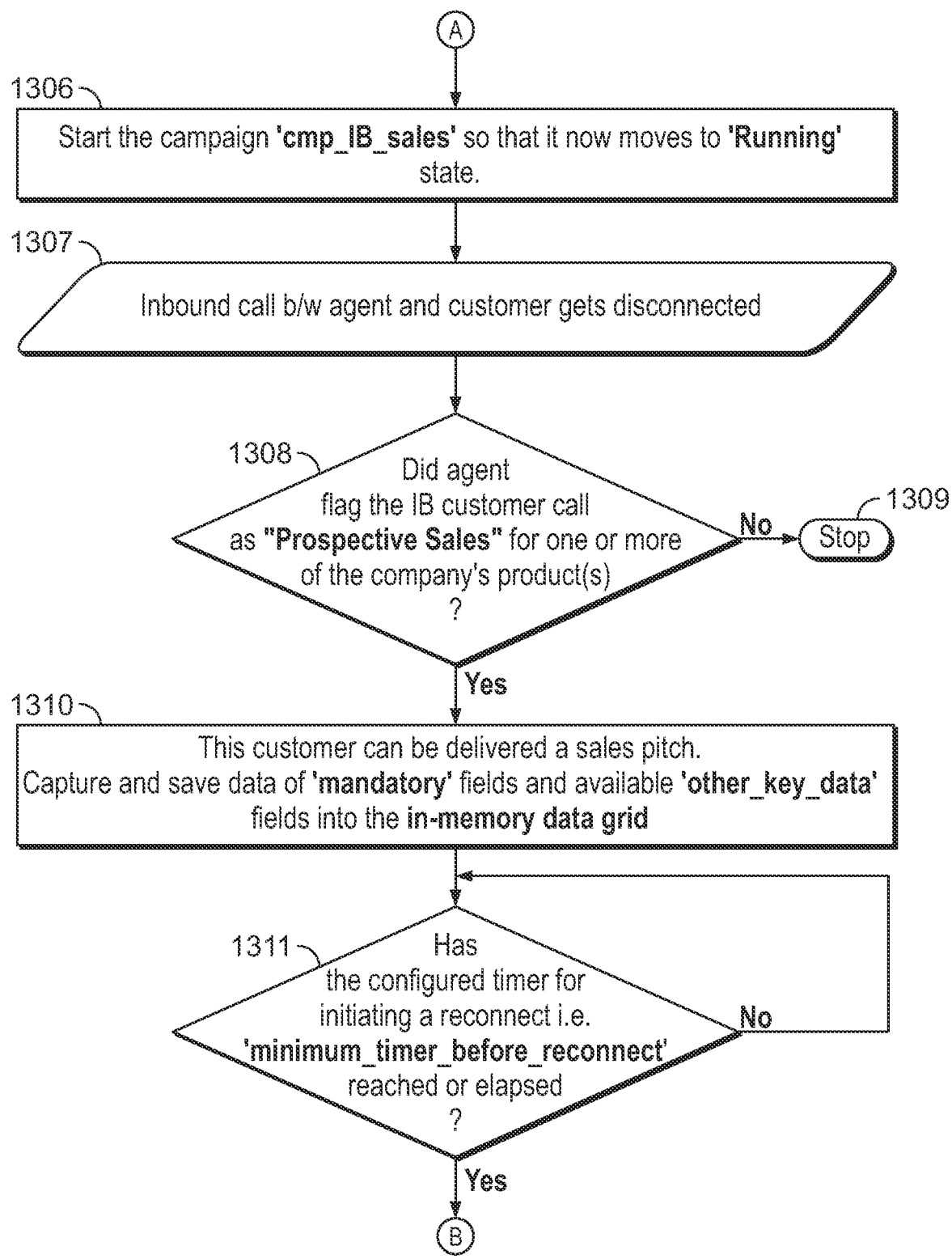
FIG. 13 (Cont. 1)

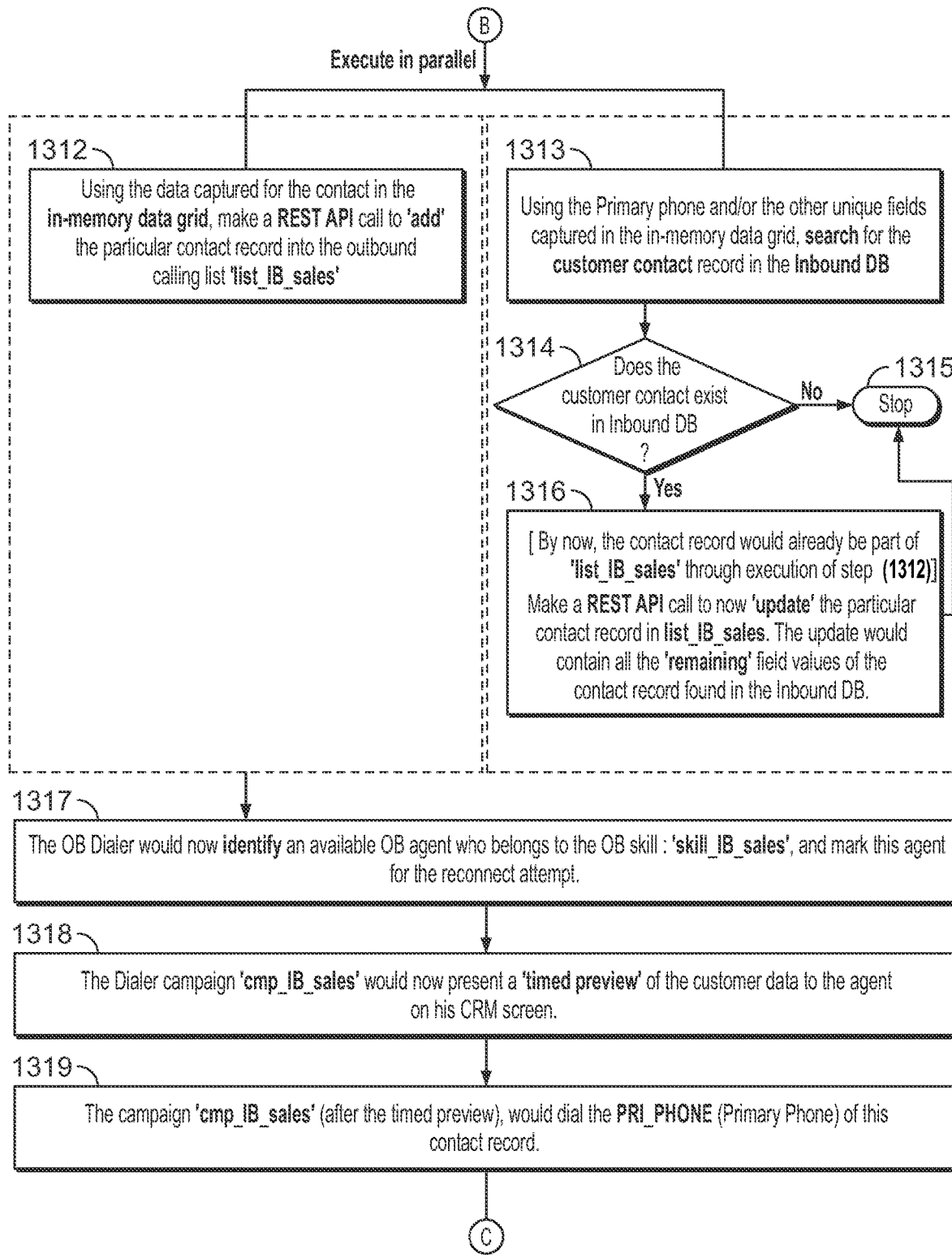
FIG. 13 (Cont. 2)

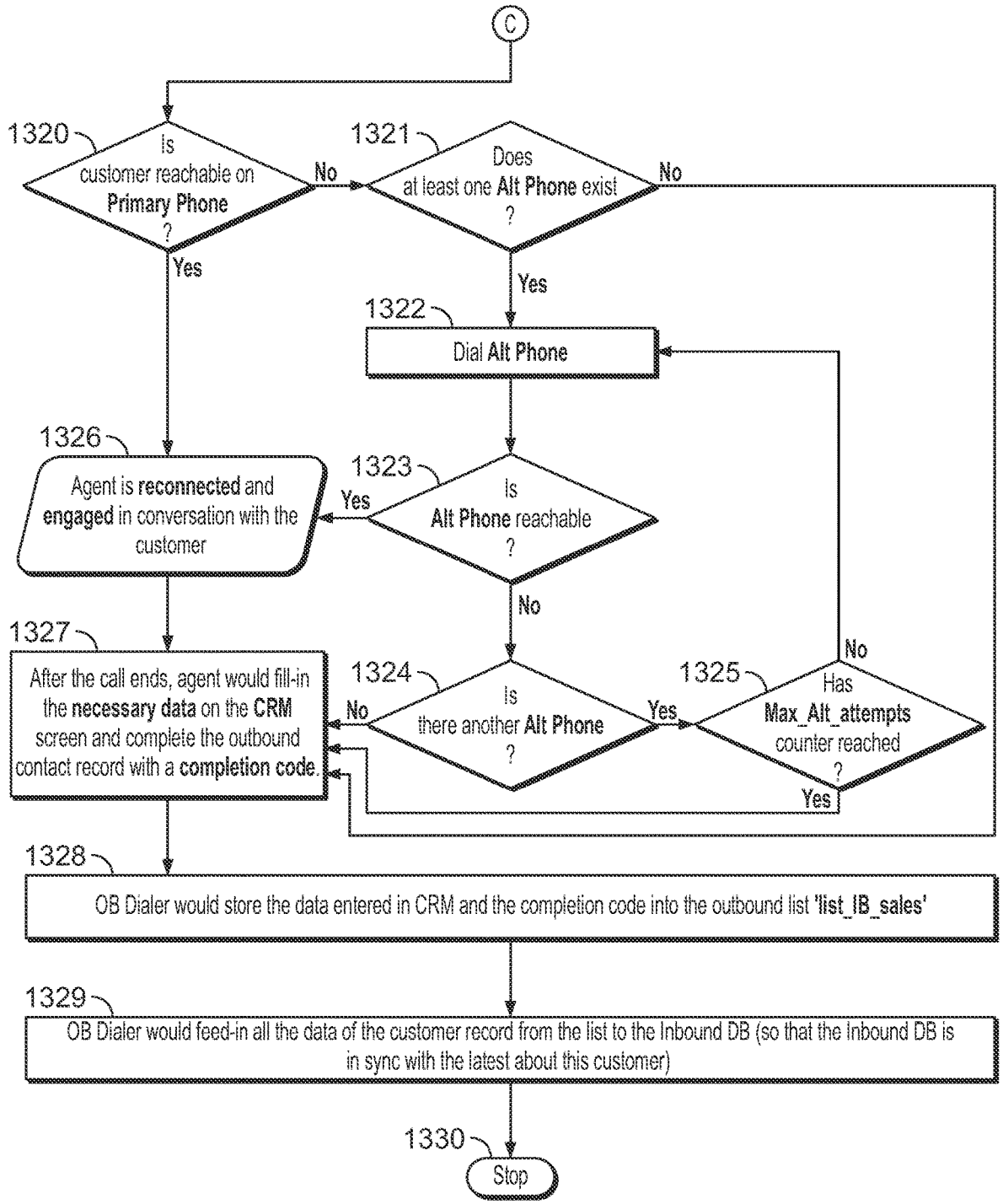
FIG. 13 (Cont. 3)

SYSTEM AND METHOD FOR RECONNECTING AN INBOUND ORIGINATED CALL

FIELD OF THE INVENTION

The present invention relates generally to the field of communication systems. More specifically, the present invention relates to reestablishing an interrupted connection between devices, such as a customer device and an agent device of a contact center.

BACKGROUND OF THE INVENTION

Dropped or disconnected communications sessions, e.g. dropped calls, occur in many contexts. For example, a contact center call between an agent and a customer can be abruptly dropped in a voice conversation between agents and customers due to network or carrier issues or as a result of a developed fault in hardware or software used in the connection.

The cause of call drop can be as a result of connectivity issues from the near-end (agent network), far-end (customer network) or any intermediate node in the entire Voice over Internet Protocol (VOIP) network path. It is known that call drops when using cellular networks are more likely due to range issues, e.g. due to weak cellular network coverage, or other cellular network issues such as network overload, weather conditions or destructive interference related to nearby buildings.

As a result, contact centers have observed a rise in call drops due to an increased number of customers using mobile phones. The number of call drops may further increase when agents work from home (remote working) and agents' devices are connected to a contact center system via Wi-Fi networks or mobile phones using cellular networks. Further, VOIP networks used in contact centers may develop faults, e.g. a fault in a data switch or at an intermediate node in the VOIP network path, leading to interrupted connections, e.g. call drops. It is also possible that VOIP networks face bandwidth or congestion issues due to peak network traffic, resulting in poor voice quality, which can further lead to an abrupt call drop or one of the involved parties dropping the call.

As a result of an interrupted call, a customer may have to call back the contact center, wait in queue to get connected to an agent and may be connected to a different agent than they were speaking to prior to the call interruption. In case a customer is not connected to the same agent they were connected to prior to the interruption of the call, another agent, who might not even have a reference of the recent conversation prior to the call interruption, may require the customer to repeat reasons for the call, e.g. re-explaining his problem from start, resulting in reduced availability of agents for other customers calls.

Thus, there is a need for reestablishment of failed communications sessions in a diversity of contexts; for example there is a need for contact centers to reestablish a connection between an agent and a customer after an interrupted connection, e.g. due to a fault in the VOIP network.

SUMMARY OF THE INVENTION

Embodiments of the invention may integrate an inbound system with an outbound system of contact centers to immediately reconnect interrupted calls which were originally inbound, e.g. customer had called the contact center, between an agent and a customer. Improvements and advantages of the invention may include reconnecting a customer with the same agent that they were connected to prior to interruption of the connection, e.g. a phone call.

One embodiment of the present invention may provide a method for reestablishing an interrupted connection between an agent device and a customer device, including: detecting, by an inbound system, an interrupted connection between an agent device and a customer device; transmitting, by the inbound system, customer data for the customer device to an outbound system; and reconnecting, by the outbound system, the agent device to the customer device using the customer data.

One embodiment of the present invention may provide a system for reestablishing an interrupted connection between an agent device and a customer device, including: a computing device; a memory, configured to store customer data related to a customer device of a customer; and a processor, the processor configured to: detect an interrupted connection between an agent device and the customer device; transmit customer data for the customer device to an outbound system; and reconnect the agent device to the customer device using the customer data.

While examples herein concern agents at a contact center, the application of this invention is generic and shall be applicable to any domain/industry.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
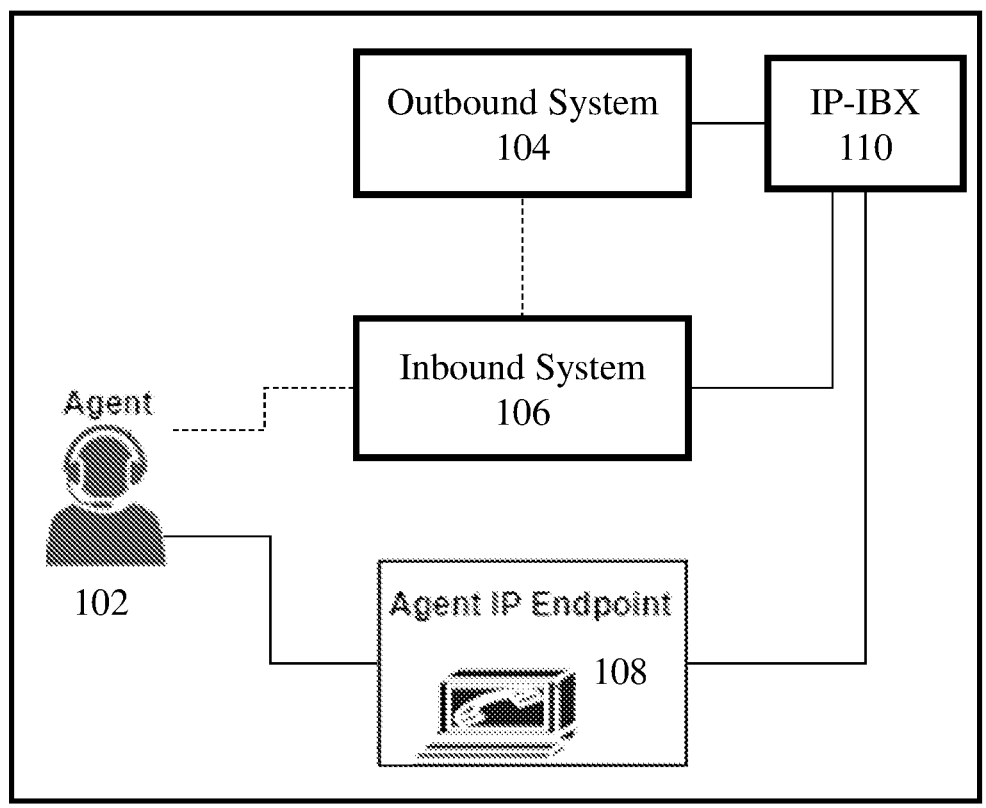
FIG. 1 is a high-level block diagram of a system for reestablishing an interrupted connection between an agent device and a customer device, according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer or other electronic computing device, that manipulates and/or transforms data represented as physical (e.g., electronic) quantities within the computer's registers or memories into other data similarly represented as physical quantities within the computer's registers and/or memories or other non-transitory storage medium that may store instructions to perform operations and/or processes.

The term set when used herein may include one or more items. Unless explicitly stated, the method embodiments described herein are not constrained to a particular order or sequence. Some of the described method embodiments or elements thereof can occur or be performed simultaneously, at the same point in time, or concurrently.

Figure 2:
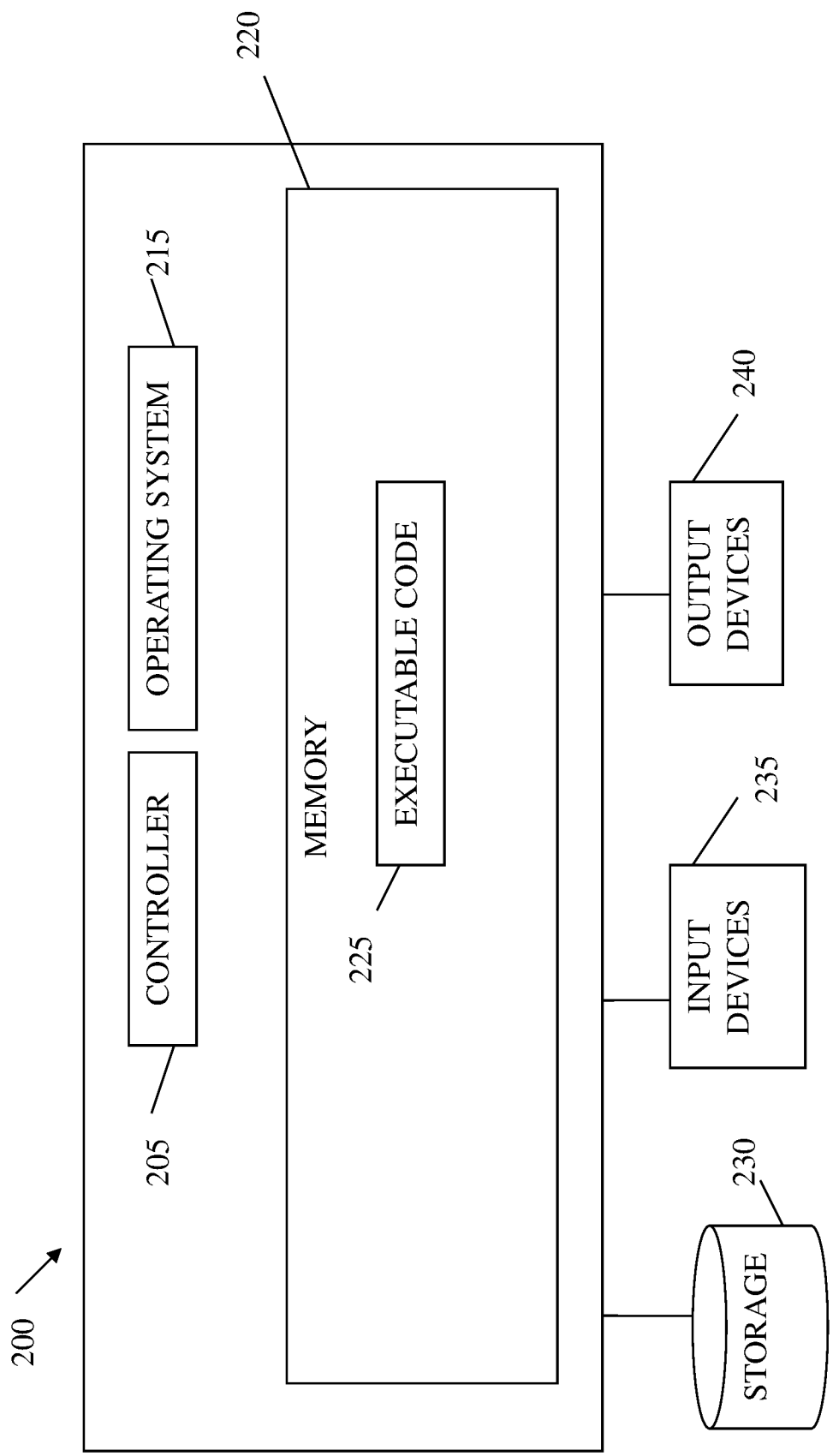
FIG. 2 is a high-level block diagram of an exemplary system, according to embodiments of the present invention.

FIG. 1 shows a block diagram of a contact center 100. While embodiments of the invention may be used in any suitable context to reconnect dropped connections, the example of a contact center is provided for explanation only. Thus while agent devices and customer devices are used as examples, any sort of device used for an interaction, connection, or telephone call may be used with embodiments of the invention. In one embodiment, an agent device can be any device used to view, edit and update data present in a data base, e.g. customer data. A contact center may be a central point from which a business manages all customer interactions across various channels, e.g. phone calls. In an embodiment, the primary purpose of a contact center is to offer customers an efficient and effective technical support, customer service and sales assistance. In other embodiments, technology described as part of contact center 100 may be used in other contexts than a contact center with agents. Contact center 100 may include or connect to (e.g. remotely) a plurality of agents (e.g. agent 102) and a plurality of agent devices, e.g. one or more agent endpoint(s) and one or more agent computer desktop(s), e.g. endpoint 108. An agent device 108 may be a voice endpoint device, e.g. an agent IP endpoint, a telephone or a mobile phone. An agent device 108 may be an agent computer desktop, for example which may be used to display customer data to an agent using a Customer Relationship Management (CRM) screen. In some embodiments, an endpoint 108 may be a combination of an agent voice endpoint and an agent computer desktop including a CRM screen. An agent device may be configured to engage in telephone calls, voice, video or other interactions, and/or receive and send voice messages. One or more agents and one or more agent devices may be part of or connected to a contact center, e.g. contact center 100. For clarity reasons only one user (e.g. agent 102) using one agent device 108 is shown in FIG. 1. An agent, e.g. agent 102, may use an agent device 108, e.g. an agent computer desktop that includes a CRM screen. An agent computer desktop may run a CRM application that provides customer data, e.g. a name of a customer to an agent via a CRM screen. An agent, e.g. agent 102, may use an agent device 108, e.g. an agent IP endpoint. An agent IP endpoint may be an agent device on which voice connection, e.g. to a customer device is established. In some embodiments, an agent device 108 includes an agent computer desktop and an agent IP endpoint. Within a contact center, one or more agent devices e.g. agent IP endpoint(s) 108 may be connected to an Internet Protocol private branch exchange (IP-PBX) 110. IP-IBX 110 is a system that provides connection control functionality of agent devices, e.g. of agent endpoint 108. An IP-PBX system can exist as a physical hardware device or as a software platform. IP-IBX 110 may be linked to inbound system 106 and outbound system 104. Inbound system 106 may be software or software platforms, e.g. embodied or executed by hardware such as shown in FIGS. 1 and 2 and distributes connection requests, e.g. phone calls, from customer devices received by a contact center, e.g. contact center 100. Outbound system 104 may be software and may allow agents 102 using an agent device 108 to initiate connection requests, e.g. a connection request to a customer device. In an embodiment, outbound system 104 is configured to automatically initiate an outbound connection request between an agent device and a customer device. An IP-PBX 110 may enable to connect an incoming connection request by a customer, e.g. a voice call or phone call from a Voice over Internet Protocol (VOIP) network, via inbound system 106 to an agent 102. Thereby, the IP-PBX 110 may connect an incoming connection request from a customer device to an available agent device of a plurality of agent devices. Specific connection technology other an IP-PBX may be used.

For example, inbound system 106 may make a logical connection with an agent 102 when agent 102 logs-in using agent devices e.g., agent computer desktop and agent IP endpoint device 108 and while routing an inbound call (e.g. call initiated by a person or device other than the agent using agent device; e.g. initiated by a customer external to a call center) to the agent (from the customer device). The actual VOIP connection for agent device 108 and a customer device (which connects to the agent device) may happen via IP-PBX 110 of contact center 100. Inbound system 106 may provide all relevant agent and customer data to connect and to allocate connection requests between customers and agents, e.g. VOIP calls, sending customer data via a logical connection of inbound system 106 and agent computer desktop of agent 102, e.g. using Customer Relationship Management (CRM) screen.

Contact centers, e.g. contact center 100, may include an internal network, e.g. an internal VOIP network, that enables nodes to connect with each other, e.g. specific systems such as inbound system 106 and outbound system 104, servers, devices 108 such as agent computer desktop, end-point devices such as agent IP endpoint, and other end-points that require internal voice communication. A VOIP network of a contact center can have multiple voice channels which can be used by VOIP end-point devices to communicate via voice between them.

Nodes (which are VOIP end-points) can exchange voice information (e.g., voice packets) between each other. Nodes (VOIP end-points) that are connected in a voice connection, e.g. between a customer device and an agent device, may also have connection control capabilities like call setup, call connect, call disconnect/tear-down, hold, un-hold, transfer, conference, play Interactive Voice Response (IVR) etc.

A "physical" connection between nodes, may be a "voice" connection between two nodes, for example, a connection of an inbound system 106 and an IP-IBX 110 of a contact center 100, e.g. part of an established telephone connection between a customer device and an agent device. Physical connections (or voice connections) between nodes may be depicted with direct lines within the figures.

A "logical" connection may be created between two nodes if the two nodes are exchanging data between each other, e.g. prior to establishment of a voice communication. Processing and exchange of data between nodes in a logical connection may occur after establishment of conditions to process/exchange data, e.g. by a physical connection between two nodes. For a logical connection between two nodes, a physical connection between nodes may have been established by an inbound system, e.g. inbound system 106 and an outbound system, e.g. outbound system 104. The logical connections may be shown in dotted lines within the figures.

Inbound and outbound systems may form logical as well as physical connections with nodes and maintain a mapping between them. They may have the capability to interact with nodes of the logical connection for data processing and data exchange and use nodes of the physical 'voice' connection, for example to retrieve telephone protocols and transmit call control instructions, e.g. interruption, hold, or initiation of a call. For any activity by a node in the logical connection, the inbound or outbound system can transmit relevant telephone instruction to a node in the corresponding physical connection.

Such a connection may be in the reverse direction, e.g., for any telephone activity by a node in the physical connection, an inbound or outbound system can transmit instructions to nodes of the corresponding logical connection. For example, inbound system 106 and outbound system 104 may have a physical (voice) connection with IP-PBX 110 and a logical connection with agent 102.

Inbound system 106 may send telephone instructions to IP-PBX 110 and may send data identifying an agent endpoint 108, e.g. a phone number of an agent device, to IP-PBX-110. IP-PBX 110 may process retrieved data and transmit telephone instructions to an agent endpoint, e.g. agent device 108. IP-PBX 110 may also receive telephone instructions from an agent device, e.g. agent device 108, and may transmit telephone instructions to inbound system 106. For example, referring to FIG. 1, inbound system 106 may have a physical connection with IP-PBX 110. IP-PBX 110 may have a physical connection with agent IP endpoint 108. Also, agent 102 may have a physical connection with agent IP endpoint 108. Agent 102 may be connected, e.g. via a head-set, to agent IP-endpoint 108. When agent 102 is logged-in using an agent device, e.g. agent computer desktop comprising a CRM screen, the CRM screen may provide a CRM application, e.g. in form of a user interface, that allows agents to connect to inbound system 106, for example to view and edit customer data when inbound calls are received, to complete customer data after a connection to a customer, to indicate availability for a connection request or indicate an unavailability for a connection request etc.

Once an agent is logged in using the CRM application which runs on an agent computer desktop 108, the agent may be authorized and may form a logical connection to an inbound system 106. In addition to the logical connection between the agent computer desktop of agent 102 and inbound system 106, agent 102 may also be physically connected, e.g. via an agent endpoint 108, e.g. a headset to a telephone extension which is registered in IP-PBX 110 and visible in the display of the endpoint device 108.

As part of the login process, inbound system 106 may instruct (e.g., telephone instruction) IP-PBX 110 to make the connection to the extension of agent device 108 available for incoming connection requests. IP-PBX 110 enables the connection of incoming connection requests to agent IP endpoint 108, e.g. in form of a physical 'voice' connection. Inbound system 106 may map agents connected to the inbound system 106 to identify available agents for incoming connection requests.

An inbound connection request may be received at agent IP Endpoint 108. Upon answering the connection request, agent 102 may be connected to a contact center 100.

If an agent, e.g. using an agent device 108 (used for physical voice connection) has not interrupted a connection to inbound system 106, inbound system 106 may consider agent 102 connected to inbound system 106 via a logical connection as available to answer an incoming connection request, e.g. by a customer device. If an agent logs-out or closes the CRM application abruptly on the agent computer desktop, inbound system 106 and agent 102 may disconnect (first via the logical connection and it may then instruct IP-PBX 110 to disconnect a physical connection between IP-PBX 110 to agent device 108) and an agent is no longer available to be allocated to an incoming connection request.

Inbound system 106 may establish a logical connection during an incoming connection request (e.g. initiated by a customer or customer device trying to contact a contact center, e.g. contact center 100) to an agent. When an incoming connection request is received at IP-PBX 110 of contact center 100, IP-PBX 110 may transmit the connection request to inbound system 106.

An automatic call distributor (ACD) of inbound system 106 may route an inbound connection request to an agent. If an available agent has been identified by an ACD of inbound system 106, inbound system 106 may retrieve customer data related to the customer device, e.g. from a database, e.g. database 1005 (see FIG. 10) and present customer data to the agent using the CRM screen on an agent computer desktop device. At this point, inbound system 106 forms a logical connection with the agent 102. Thereby, customer data is presented on a CRM screen to agent 102 via the logical connection between inbound system 106 and agent 102.

The coordination of an incoming connection request, e.g. a telephone call, in combination with the provision of customer data to an agent device may be referred to herein as computer telephony integration (CTI). An inbound system may essentially generate CTI capabilities whenever a physical connection between an agent 102 via an agent device, e.g. agent device 108 and IP-PBX 110 and a logical connection between an agent 102 via an agent computer desktop and the inbound system 106 are established and may co-ordinate activities between them.

A VOIP connection for agent device 108 and a customer device via IP-PBX 110 of contact center 100 may be regarded as a physical (voice) connection.

The systems used in contact centers as disclosed herein can be extended to non-VOIP e.g. traditional digital circuits. Thereby, inbound and outbound systems may be operable regardless of the telephone protocol type used for the establishment of connections between customer devices and agent devices of the contact center, e.g. for the establishment of inbound and outbound connections to a contact center.

In an embodiment, inbound system 106 is configured to detect an interrupted connection between an agent device and the customer device and is configured to transmit customer data for the customer device to an outbound system. Inbound system 106 may also be configured to block an agent device from receiving incoming connection requests and may be configured to unblock an agent device from receiving incoming connection requests.

Outbound system 104 may be configured to reconnect the agent device to the customer device using the data describing the other device (e.g. the customer device) or describing the user (e.g. in one example a customer): for example this may be customer data. Additionally, outbound system 104 may be configured to provide an agent device with customer data for a customer device retrieved prior to the interrupted connection.

FIG. 2 shows a high-level block diagram of an exemplary computing device which may be used with embodiments of the present invention. Computing device 200 may include a controller or processor 205 that may be, for example, a central processing unit processor (CPU), a chip or any suitable computing or computational device, an operating system 215, a memory 220, a storage 230, input devices 235 and output devices 240 such as a computer display or monitor displaying for example a computer desktop system. Each of modules and equipment such as user devices (e.g. agent device and customer device), agent IP endpoint 108, IP-IBX 110, outbound system 104, inbound system 106 and other devices and modules discussed herein may be or include, or may be executed by, a computing device such as included in FIG. 2 although various units among these modules may be combined into one computing device.

Operating system 215 may be or may include any code segment designed and/or configured to perform tasks involving coordination, scheduling, arbitration, supervising, controlling or otherwise managing operation of computing device 200, for example, scheduling execution of programs. Memory 220 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 220 may be or may include a plurality of, possibly different memory units. Memory 220 may store for example, instructions (e.g. code 225) to carry out a method as disclosed herein, and/or data.

Executable code 225 may be any executable code, e.g., an application, a program, a process, task or script. Executable code 225 may be executed by controller 205 possibly under control of operating system 215. For example, executable code 225 may be one or more applications performing methods as disclosed herein. In some embodiments, more than one computing device 200 or components of device 200 may be used for multiple functions described herein. For the various modules and functions described herein, one or more computing devices 200 or components of computing device 200 may be used. Devices that include components similar or different to those included in computing device 200 may be used, and may be connected to a network and used as a system. One or more processor(s) 205 may be configured to carry out embodiments of the present invention by for example executing software or code. Storage 230 may be or may include, for example, a hard disk drive, a floppy disk drive, a Compact Disk (CD) drive, a CD-Recordable (CD-R) drive, a universal serial bus (USB)

device or other suitable removable and/or fixed storage unit. Data may be stored in a storage 230 and may be loaded from storage 230 into a memory 220 where it may be processed by controller 205. In some embodiments, some of the components shown in FIG. 2 may be omitted.

Input devices 235 may be or may include a mouse, a keyboard, a touch screen or pad or any suitable input device. It will be recognized that any suitable number of input devices may be operatively connected to computing device 200 as shown by block 235. Output devices 240 may include one or more displays, speakers and/or any other suitable output devices. It will be recognized that any suitable number of output devices may be operatively connected to computing device 200 as shown by block 240. Any applicable input/output (I/O) devices may be connected to computing device 200, for example, a wired or wireless network interface card (NIC), a modem, printer or facsimile machine, a universal serial bus (USB) device or external hard drive may be included in input devices 235 and/or output devices 240.

Embodiments of the invention may include one or more article(s) (e.g. memory 220 or storage 230) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Figure 3:
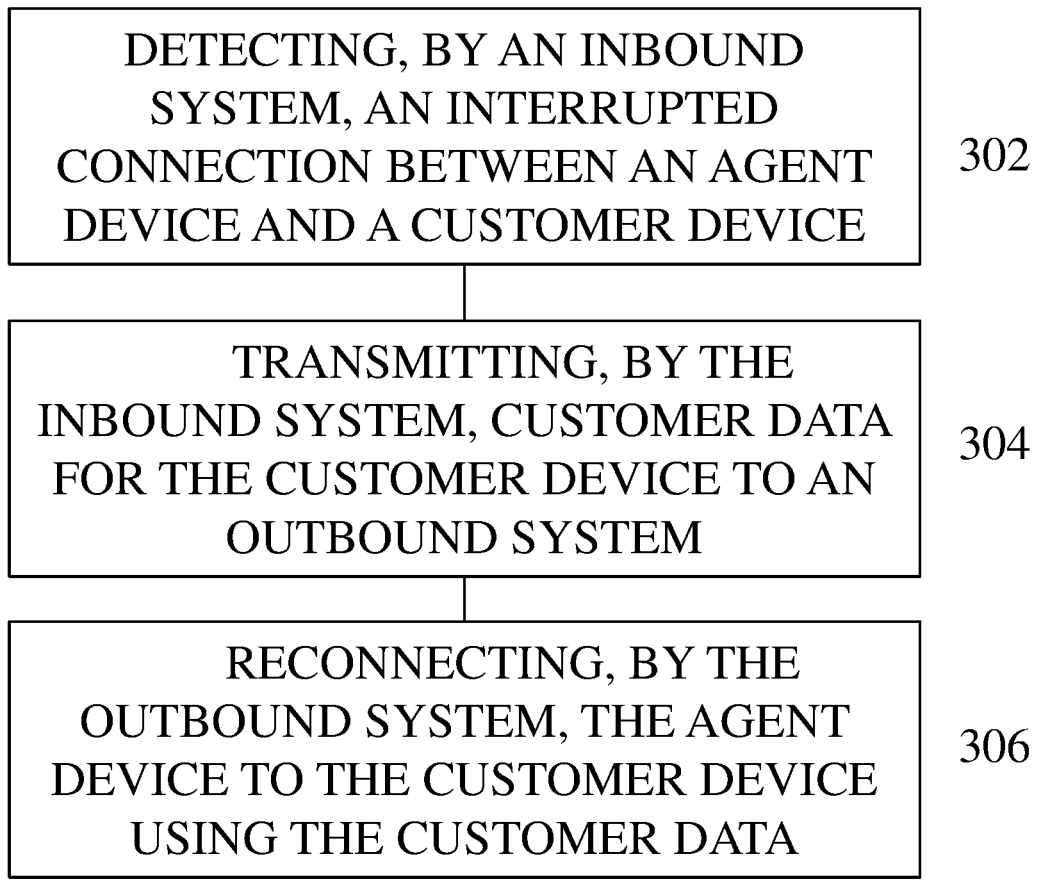
FIG. 3 is a flowchart of a method for reestablishing an interrupted connection between an agent device and a customer device, according to embodiments of the present invention.

FIG. 3 shows a method 300 for reestablishing an interrupted connection between user devices such as an agent device and a customer device, according to an embodiment of the invention.

Method 300 may include detecting, by an inbound system, an interrupted connection between a user device (e.g. an agent device) and another user device (e.g. a customer device) (step 302). An inbound system may direct an incoming connection request (e.g. an incoming telephone call) from a customer device to an agent device of a plurality of available agent devices, for example by using an IP-IBX system to establish a connection between an agent device of an agent and a customer device of a customer.

For a detection of an interrupted connection between an agent device and a customer device, existing methods may be used that are known in the art, for example methods to identify a telephone call drop. A connection between an agent device and a customer device may be interrupted by a customer device. For example, a customer device being disconnected from a cellular tower leading to a disconnection of a customer device, e.g. a customer mobile phone, from a Remote Service Provider, e.g. a mobile network operator, as outlined in FIG. 6. A connection between an agent device and a customer device may be interrupted by an agent device. For example, an agent may be remotely connected to a contact center network and a remote network connection may disconnect the agent from an IP-PBX of a contact center, e.g. as detailed in FIG. 7. A connection between an agent device and a customer device may be interrupted as a result of a fault developed at a switch of a VOIP network. For example, a network switch may have developed a fault, e.g. as detailed in FIG. 8.

Method 300 may include transmitting, by the inbound system, data describing the other device (e.g. the customer device), such as customer data (for example: customer phone number, customer name, dropped call details and other_key_data like SSN_No, Accnt_No, Credit_Card_No, Notes written by agent etc.) for the customer device, and other data, to an outbound system (step 304). In an embodiment, the agent device may be blocked, e.g. prevented from connecting, ignored, etc., by the inbound system to receive incoming connection requests.

Method 300 may include reconnecting, by the outbound system, the agent device to the customer device using the customer data (step 306). Such a reconnection may be in the form of an outbound telephone call to a user device such as the customer device or an alternative customer device, such as a user's other telephone.

In one embodiment, an agent device may be blocked by an inbound system from receiving incoming connection requests, e.g. after the identification of an interrupted connection by an inbound system. In one embodiment, the agent device may be unblocked by the inbound system and allowed to receive incoming connection requests, e.g. after the reconnected connection is disconnected by the agent device or by the customer device to terminate the connection for example at the end of a conversation.

In one embodiment, reconnecting the agent device to the customer device includes, for example, establishing a connection from the outbound system to the customer device; and connecting the agent device to the established connection to the customer device. Such a connection may be a voice connection between a customer and an agent device to carry on a telephone call such as a VOIP (voice over IP) call with CTI (computer telephony integration) for an agent to view and update customer data. A reconnection of a connection may be established via the outbound system from an agent device to an Internet Protocol private branch exchange that is connected via a service provider network to the customer device; this may be an outbound telephone call, or another type of connection. In case when the agent device is unavailable, reconnection of an agent device to the customer device may include reconnecting the customer device to an alternative agent device. An alternative agent device may be any other agent device of a contact center that is available for a connection to a customer device. In case a reconnection attempt to a customer device is unsuccessful, the outbound system may attempt to reconnect the agent device to a different device for the same user as the device for which the connection was dropped, e.g. an alternative customer device of the customer.

In an embodiment, the transmitted customer data for the customer device includes data selected from a group including a customer name, customer phone number, agent identifier and drop time. An agent device may be provided with customer data generated for the customer device prior to the interrupted connection. Data describing a device or user may be data other than customer data, e.g. user name, user or device telephone number, identifier, etc.

Figure 4:
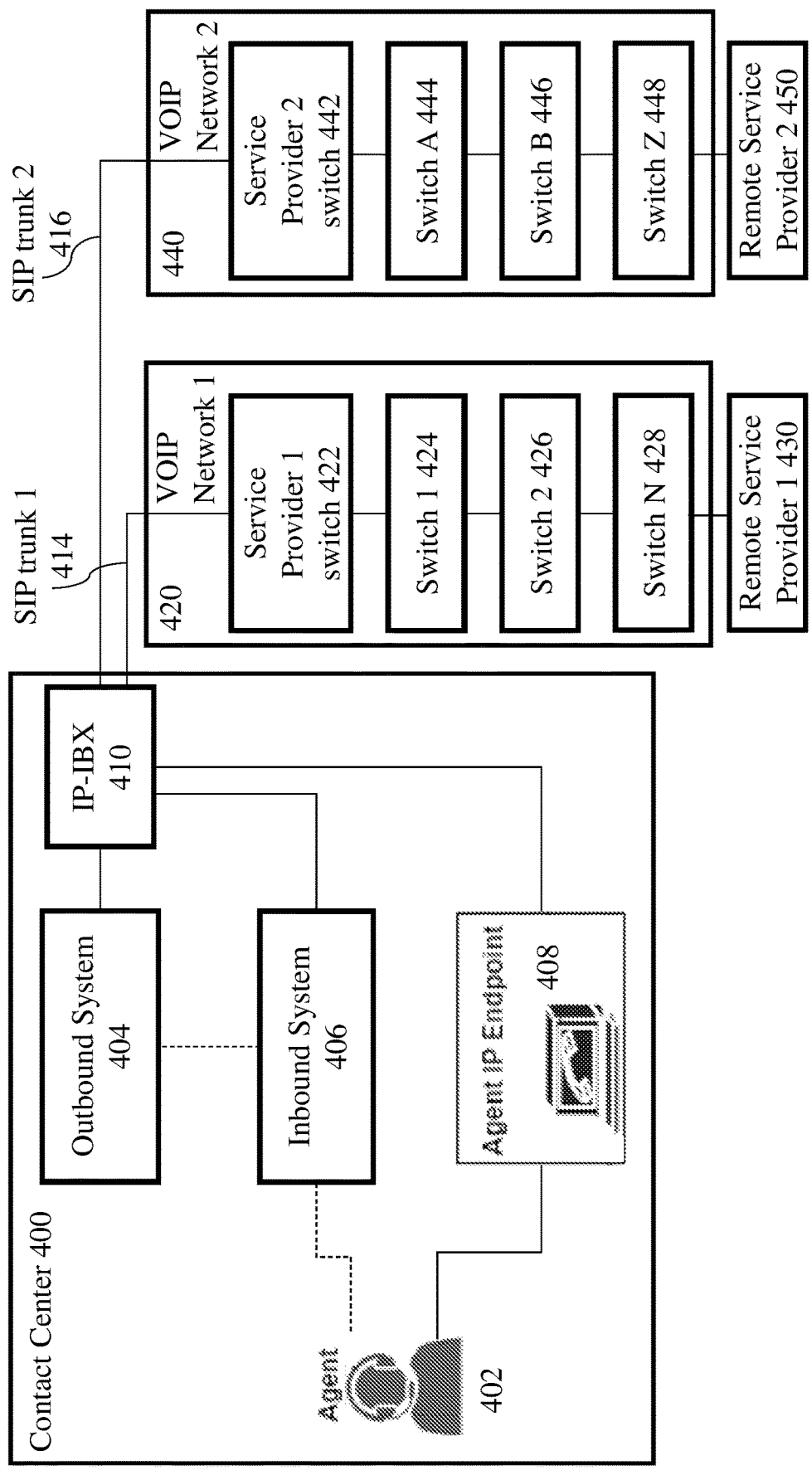
FIG. 4 is a high-level block diagram of an exemplary contact center system further depicting its connectivity to immediate Service Providers, VOIP networks and Remote Service Providers, according to embodiments of the present invention.

FIG. 4 shows an exemplary contact center system 400 further depicting its connectivity to immediate Service Providers, VOIP networks and Remote Service Providers, according to embodiments of the present invention.

Inbound connectivity: As depicted in FIG. 4, IP-PBX 410 may be connected to VOIP network 1 420, via Session Initiation Protocol (SIP) trunk 1 414. SIP trunk carries signaling data of multiple voice calls between the IP-PBX 410 and the VOIP network e.g. VOIP network 1 420. A VOIP network may enable the transmission of voice communication via Internet Protocol (IP) networks, such as the Internet. For example, voice signals received from an agent by an agent device may be transmitted to an IP-PBX, e.g. IP-PBX 410 and may then be converted into communication data and may be decoded back to a voice signal by a customer device. SIP trunk 1 414 connects to the immediate SIP Server Provider i.e. Service Provider 1 switch 422.

Service Provider 1 switch 422 may be connected to Remote Service Provider 1 430 via several switches of a VOIP network path. In FIG. 4, the connection of Service provider 1 switch 422 to Remote Service Provider 1 430 may be shown via a chain of three switches for easier representation. Service Provider 1 switch 422 may be connected to Switch 1 424. Switch 1 424 may be connected to Switch 2 426. Switch 2 426 may be connected to Switch N 428. Switch N 428 may be connected to Remote Service Provider 1 430.

Outbound connectivity: Outbound system 404, may include an outbound dialer and may be connected to IP-IBX 410. IP-IBX 410 may also be connected to VOIP network 2 440 via SIP trunk 2 416. VOIP network 2 440 includes a SIP Service Provider i.e. Switch Provider 2 switch 442. Service Provider 2 switch 442 may be connected to Remote Service Provider 2 450 via several switches of a VOIP network path. In FIG. 4, the connection of Service provider 2 switch 442 to Remote Service Provider 2 450 is shown via a chain of three switches for easier representation. Service Provider 2 switch 442 may be connected to Switch A 444. Switch A 444 may be connected to Switch B 446. Switch B 446 is connected to Switch Z 448. Switch Z 448 may be connected to Remote Service Provider 2 450.

Figure 5:
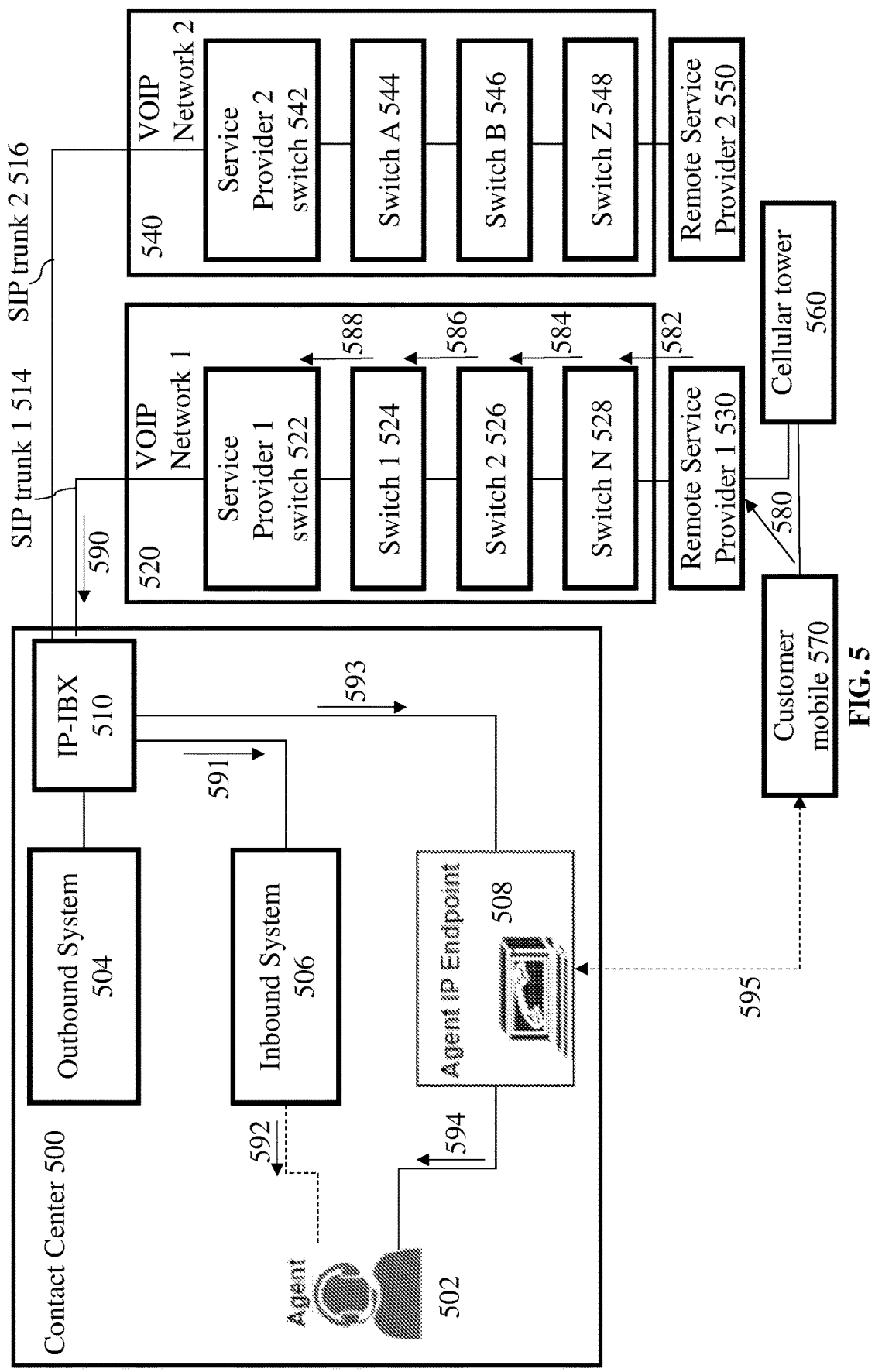
FIG. 5 is a high-level block diagram of an exemplary contact center system and connected components showing an inbound connection request, e.g. an inbound call flow initiated by a customer using a customer mobile device, according to embodiments of the present invention.

FIG. 5 shows a block diagram of a contact center 500 and connected components during an inbound connection request, e.g. an inbound call flow initiated by a customer using a device such as a customer mobile device. A mobile device may be for example a cellular telephone, a portable device using cellular or networking (e.g. WiFi) technology to communicate, or another device. A customer device may be a device other than a mobile device.

When a customer device, e.g. customer mobile device 570, attempts to establish a connection (e.g., make a telephone call) to a contact center, e.g. contact center 500, a customer device may connect via cellular tower 560 leading to a call request to Remote Service Provider 1 530 (via establishing connection 580). While a mobile device is used as one example of a device, other devices may be used, e.g. land-line telephones, desktop computers, etc.

A call request, e.g. an inbound call request to contact center 500, may then be transmitted via VOIP network 1 520. For example, as depicted in FIG. 5, a connection may be established Remote Service Provider 1 530 to Switch N 528 (via establishing connection 582), to Switch 2 526 (via connection 584), to Switch 1 524 (via connection 586), to Service Provider 1 switch 522 (via connection 588). Then a connection between VOIP Network 1 and IP-PBX 510 may be established via SIP trunk 1 514 (via connection 590).

IP-PBX 510 may send the inbound connection request to inbound system 506 which identifies device to be used to connect, such as an agent device, e.g. agent device 508, of an agent, e.g. agent 502, to receive the connection request. Inbound system 506 may establish a logical connection with Agent 502 (via connection 592) and prompts IP-PBX 510 to connect customer device 570 with an agent device, e.g. Agent IP Endpoint 508 (via connection 595). Agent 502 may be connected via a communication device, for example a headset, to agent device 508 and may receive an audio signal on their communication device signaling that a connection of a customer device is established to agent device 508 (connection 595). At this point, a Voice Real-time Transport Protocol (RTP) connection may be established between the customer device, e.g. customer mobile device 570, of a customer and an agent device, e.g. agent device 508, and they may start a conversation.

Figure 6:
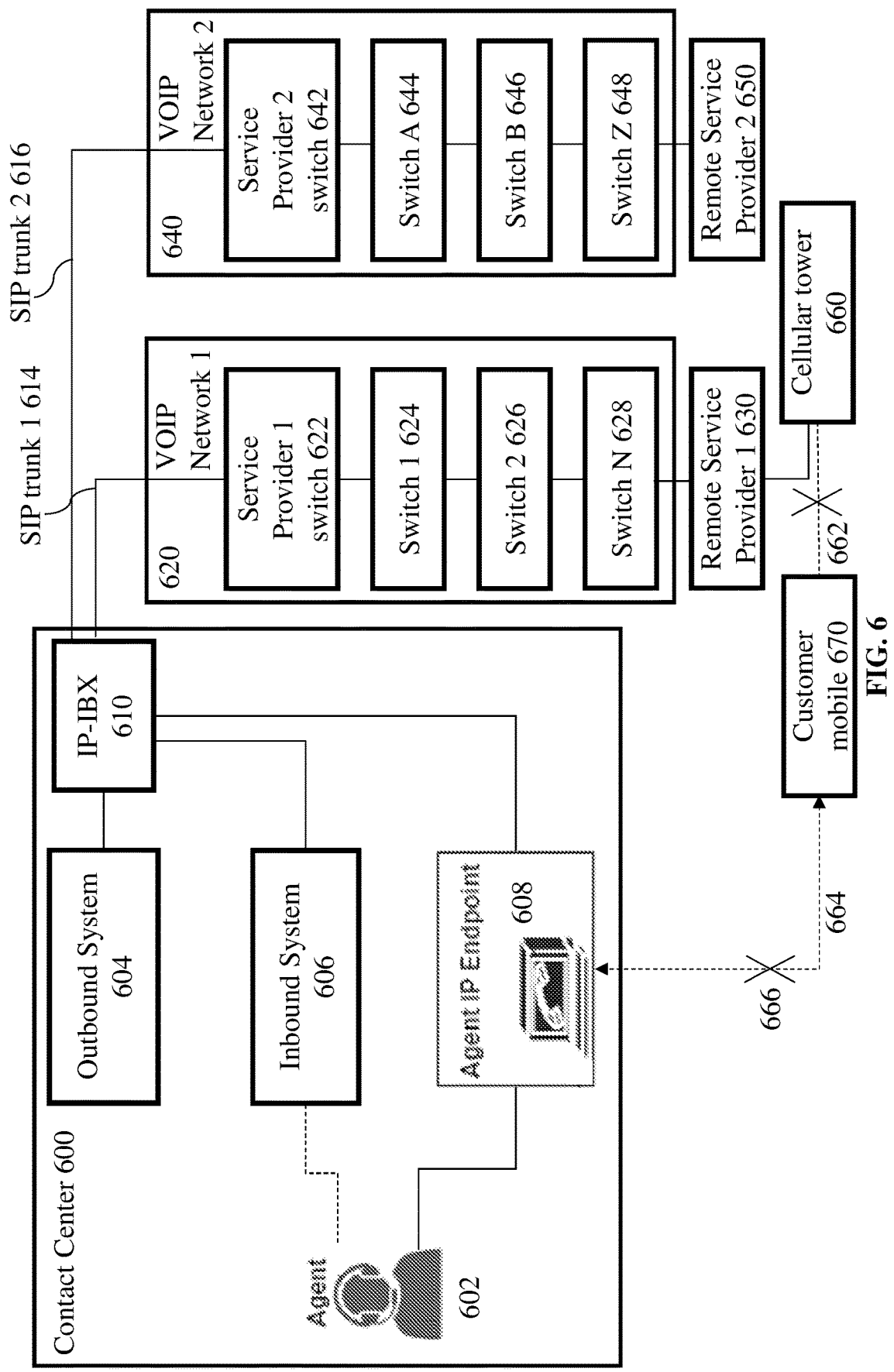
FIG. 6 is a high-level block diagram of an exemplary contact center system and connected components showing an interrupted connection between a customer device and an agent device as a result of a customer device being disconnected from a cellular tower, according to embodiments of the present invention.

FIG. 6 shows a block diagram of contact center 600 and details an interruption in the connection between an agent device, e.g. agent device 608 and customer device, e.g. customer mobile device 670. A connection between agent 602 and customer mobile device 670 may have been interrupted due to a call interruption located in connection 662 between customer mobile device and cellular tower 660, e.g. due to the customer mobile network being out of range of a customer mobile device and the customer is disconnected from cellular tower 660 (abrupt call drop 662). A disconnection between customer mobile device 670 and agent device 608 may lead to an interruption of the established SIP connection between customer and agent 602. Thereby, the Voice RTP is disconnected on inbound call 666.

Figure 7:
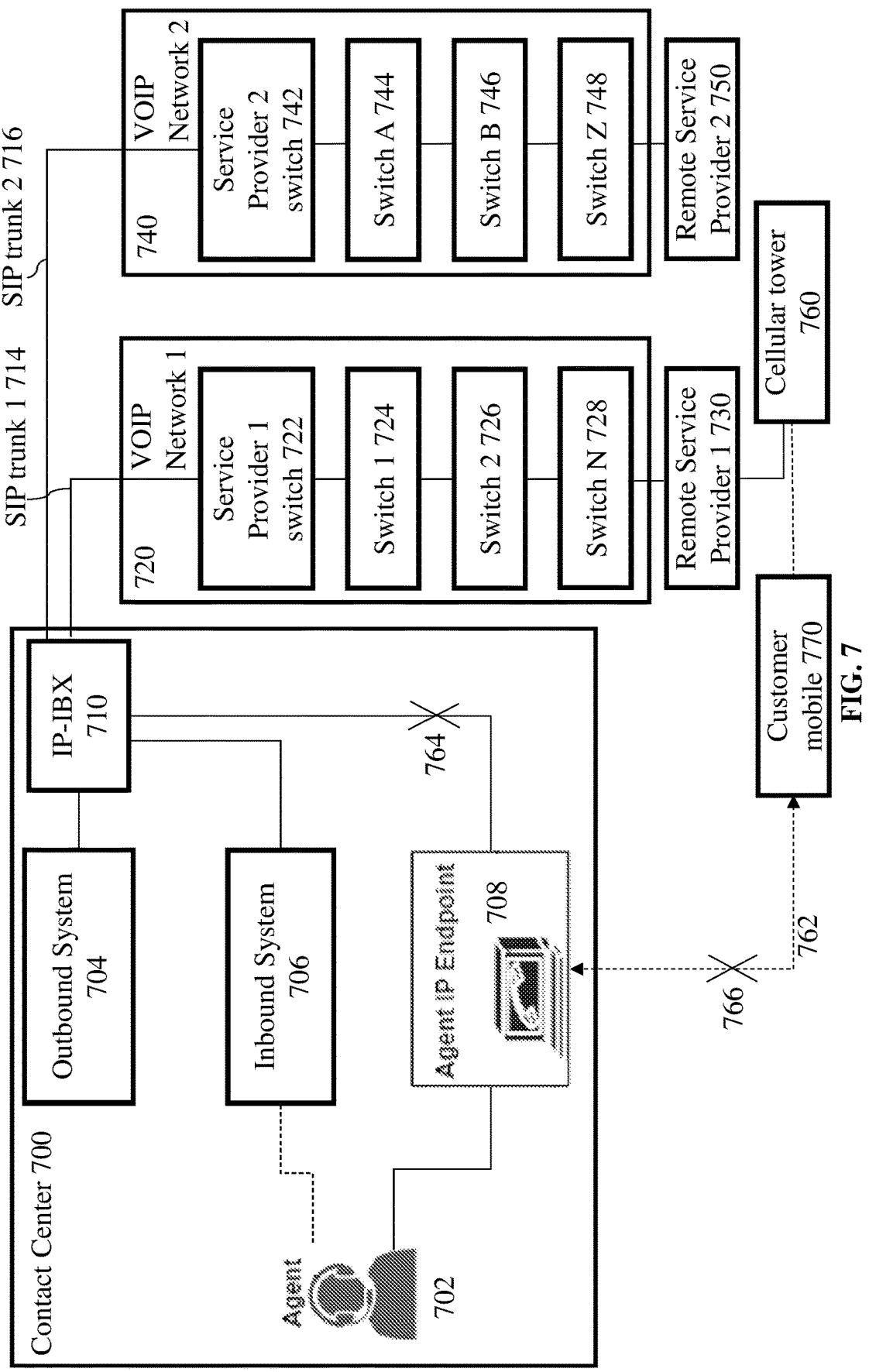
FIG. 7 is a high-level block diagram of an exemplary contact center system and connected components showing an interrupted connection between a customer device and an agent device as a result of an agent device being disconnected from an Internet Protocol private branch exchange (IP-PBX), according to embodiments of the present invention.

FIG. 7 is a block diagram of contact center 700 with its connected components and details an interruption in the connection between an agent device, e.g. agent device 708 and customer device, e.g. customer mobile device 770.

A connection 762 between agent device 708 and customer mobile device 770 may be interrupted due to a call interruption located at connection 764 between an agent device, e.g. agent IP endpoint 708, and IP-PBX 710. For example, agent 702 is connected remotely to the contact center network 700 and agent 702 is disconnected from the IP-PBX 710, e.g. due to a connection loss in a remote connection, of contact center 700 leading to an interruption of an established SIP connection between the customer device 770 of a customer and agent device 708. The interruption of the established SIP connection may lead to a disconnection of inbound call 766.

Figure 8:
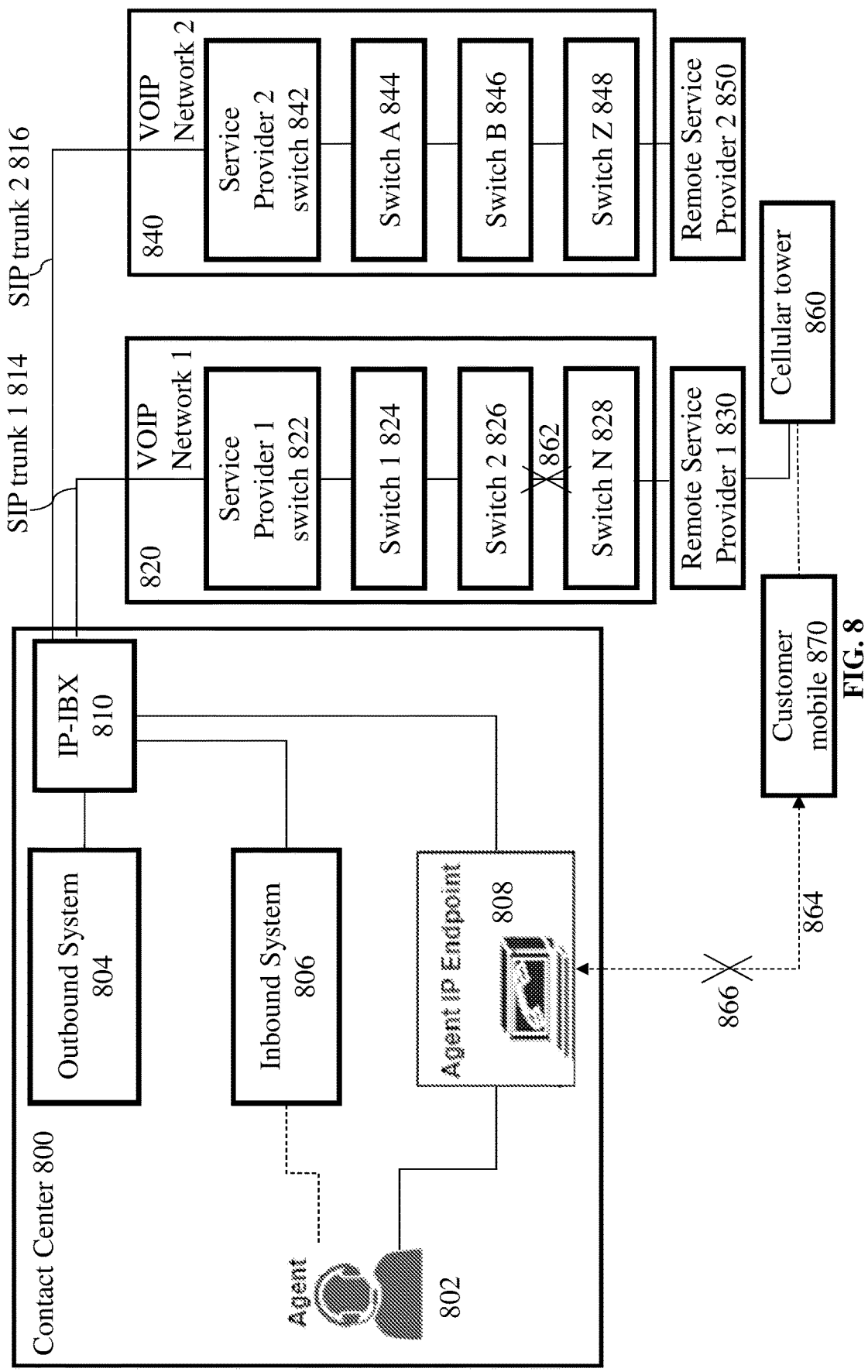
FIG. 8 is a high-level block diagram of an exemplary contact center system and connected components showing an interrupted connection between a customer device and an agent device as a result of a fault developed at a switch of a VOIP network, according to embodiments of the present invention.

FIG. 8 is a block diagram of contact center 800 and connected components and details an interruption in the connection between an agent device, e.g. agent device 808 and customer device, e.g. customer mobile device 870, as a result of a fault developed at a switch of a VOIP network. A connection between agent 802 and a customer using customer mobile device 870 may be interrupted due to a call interruption located at an intermediate node in the VOIP network 1 820, e.g. connection 862 located between Switch N 828 and Switch 2 826. The interruption may be a result of a network glitch or a fault at a switch in the VOIP network leading to connection lost between Switch 2 826 to Switch N 828. The interruption of the established SIP connection may lead to an interruption 866 in the connection of the Voice RTP of the inbound call 864.

Figure 9:
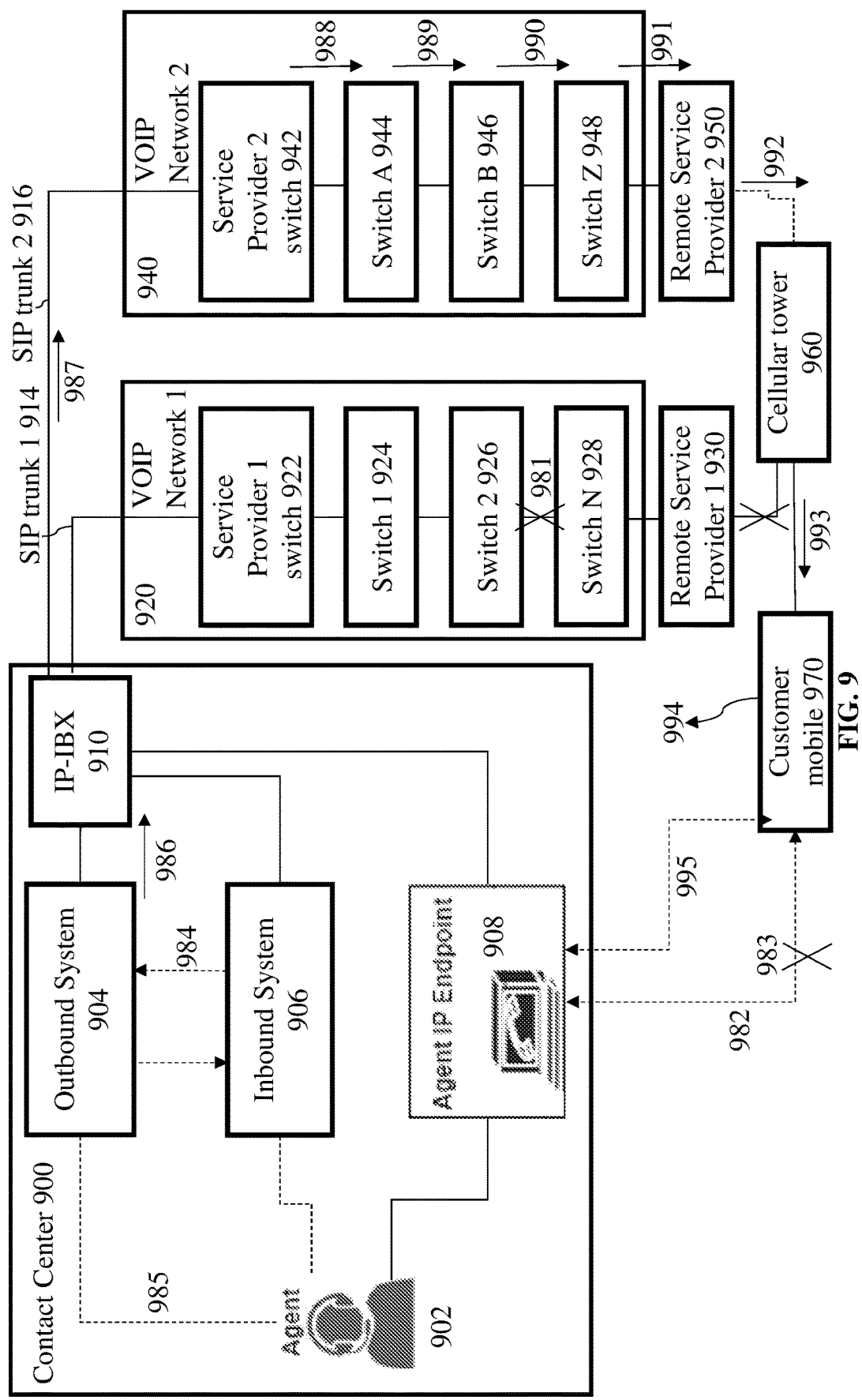
FIG. 9 is a high-level block diagram of an exemplary contact center system and connected components showing a reestablishment of an interrupted connection between an agent device and a customer device, according to embodiments of the present invention.

FIG. 9 is a block diagram depicting the reconnection of an interrupted call after a call interruption of an inbound call.

Following an interruption of an inbound connection, e.g. after an interruption of an inbound call as outlined in FIG. 6, FIG. 7 or FIG. 8, reestablishment of the interrupted connection may be initiated by inbound system 906.

Inbound system 906 may detect an interrupted connection between an agent device 908 and a customer device 970. The inbound system 906 may transmit customer data for the customer device to an outbound dialer of outbound system 904. For example, customer data for the customer device may include details about the dropped call. Customer data for the customer device may also include the customer phone number, customer name and other available data of this customer contact captured and present in an inbound system. A detailed view of the information captured and passed to the outbound dialer may be detailed in FIG. 10.

Referring back to FIG. 9, during reconnection, an agent device, e.g. agent device 908, whose connection with a customer device has been interrupted, may be disconnected from an inbound system, e.g. inbound system 906, and the agent device may be connected to an outbound dialer of outbound system 904 by establishing connection 985.

Outbound dialer of outbound system 904, may reconnect an agent device to the customer device using customer data:

Outbound system 904 may attempt to establish a connection between outbound system 904 and customer device, e.g. customer mobile device 970 by transmitting a connection request to IP-PBX 910 (via connection 986). The outbound connection request may be transmitted from IP-PBX 910 to VOIP network 2 940. IP-PBX 910 may establish a connection via SIP trunk 2 916 to Service Provider 2 switch 942 (connection 987). The connection request may proceed via switches in the VOIP network path, for example to Switch A 944 (connection 988), to Switch B 946 (connection 989), and to Switch Z 948 (connection 990).

From the last switch in the VOIP network path, the connection request proceeds to the Remote Service Provider 2 950 (connection 991). Then the connection request may be transmitted to the customer devices' nearest cellular tower 960 (connection 992) and may finally reach a customer device, e.g. customer mobile device 970 (conn 993). The outbound connection request, e.g. an outbound call, has reached the customer device and may send a connection request to the customer, e.g. in form of an audio or visual notification such as a ring of customer mobile device 970. In response to the connection request, a customer may answer the connection request, e.g. call request 994.

Upon answering the connection request, a Voice (RTP) connection 995 may be established between customer device 970 and agent device 908 via outbound system 904. At this point, the reconnect may be considered successful.

After reconnection of the connection between users (e.g. agent and customer), they may re-engage in conversation. After their conversation, the agent may update a Customer Relationship Management (CRM) application, executed by a processor of an agent device, e.g. agent computer desktop 908, with data recorded for a customer and may complete the outbound record, e.g. data record for a customer, with a completion code.

A CRM application may be integrated in an inbound system and an outbound system of a contact center. A CRM application may enable data processing of customer data by an outbound system or by an inbound system. Alternatively, a CRM application may enable data processing of customer data for inbound and outbound connection requests. Agent devices that are connected to incoming customer connection requests may use a CRM application for an inbound system whereas agent devices that are connected to outgoing customer connection requests by the outbound system may use the CRM application of the outbound system.

For example, for an incoming connection request, customer data related to a customer that sends a connection request to a contact center, may be presented to an agent via a CRM screen/application. Displayed customer data may be part of an inbound database of a contact center. An inbound system may transmit customer data from the inbound system and present customer data to an agent on a CRM screen of a CRM application running on the agent computer desktop. The agent, connected to a customer after establishing a connection to an incoming connection request, e.g. by a customer device, can update and dispose/complete customer data using a CRM screen.

Similarly, for an outbound dialer, customer data may be part of a calling list. A calling list of an outbound system may comprise customer data of an outbound database. During the establishment of an outbound connection request, e.g. a connection request such as a phone call from the outbound system to a customer, the outbound system may transmit customer data of a customer from the corresponding calling list and present customer data to an agent on a CRM screen of a CRM application running on the agent computer desktop, e.g. desktop 108. An agent can update customer data, for example, by using the CRM screen and dispose/complete the outbound data, e.g. with a completion code.

Figure 10:
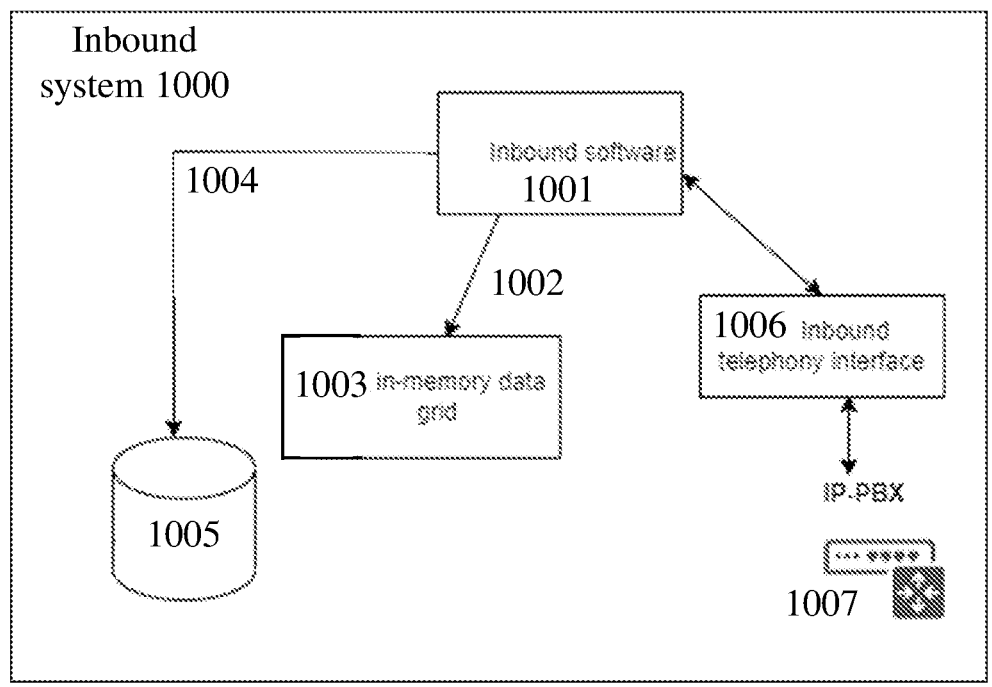
FIG. 10 is a high-level block diagram of an inbound system of an exemplary contact center system, according to embodiments of the present invention.

At this point, the outbound system 904 may transmit updated data on a customer, e.g. customer of customer device 970 to an inbound system database, e.g. database (see FIG. 10). Outbound system 904 may then disconnect a connection between an agent and an agent is connected to the inbound system 906. After connection to the inbound system, the agent may now be available to take the next inbound call.

Inbound system and outbound system are systems that enable a logical connection to an agent (e.g. to an agent's CRM application on the agent computer desktop 108) and connect to an IP-PBX of a contact center by establishing a physical "voice" connection.

Agent devices such as an agent's CRM application on agent computer desktop 108, computing device or a phone device may coordinate data transfer and synchronization between the devices using a computer telephone integration (CTI) for incoming and outgoing connection requests.

Inbound and outbound systems may coordinate interactions between the logical connection and physical connection formed with an agent. For example, an outbound system may present customer data related to a customer on a CRM screen on agent computer desktop via a logical connection when a connection request to a customer device is initiated by an outbound system or during disconnection of an outbound call.

FIG. 10 shows a block diagram of inbound system 1000. Inbound system 1000 may include inbound software 1001. Inbound software may be used to establish a connection to IP-PBX 1007 via inbound telephony interface 1006. Inbound software 1001 may be configured to store data for connections, e.g. a call between a customer and an agent, that resulted in a normal disconnect. In this context, a normal disconnect may refer to an interruption of a connection by either an agent or a customer that is planned, e.g. to end a conversation at the end of a phone call. Inbound software 1001 is configured to store data for connections, e.g. call between a customer and an agent, that resulted in a disconnect. In this context, a disconnect may refer to an unexpected interruption of a connection by either the agent, the customer device, or within a connection required for a connection of agent and customer.

Inbound software 1001 may further be configured to store customer data related to interrupted connections, e.g. call drops, in memory, e.g. a memory data grid 1003. For example, after an unexpected interruption of a connection between an agent and a customer, inbound software 1001 may store customer data into the in-memory data grid 1003 upon a call drop 1002. Customer data from the in-memory data grid may include key fields such as phone number, agent identifier, call drop time, Accnt_No, SSN_No, Credit Card No, and Notes captured by the agent from the customer interaction etc. These key fields saved into the in-memory data grid may help in presenting most of the contextual data based on the customer's recent conversation with the agent when the call is reconnected through the outbound system. In an embodiment, in-memory storage 1003 is only used if a call drop 1002 is detected. Customer data may include other key fields as outlined below.

Storing and updating of customer data in inbound database 1005 may automatically proceed for all inbound calls when they get disconnected 1004, irrespective of whether it was a normal disconnect or an unexpected interruption of a connection, e.g. due to call drop.

As detailed above, in FIGS. 4-9, SIP trunks and mentioned SIP have been disclosed as the signaling protocol supporting VOIP, however the invention disclosed herein can be extended to any other protocol that supports VOIP. For example, it can be extended to even non-VOIP such as traditional digital circuits. In that sense, this invention may be independent from the communication protocol being used for incoming and outbound calls in a contact center.

Figure 11:
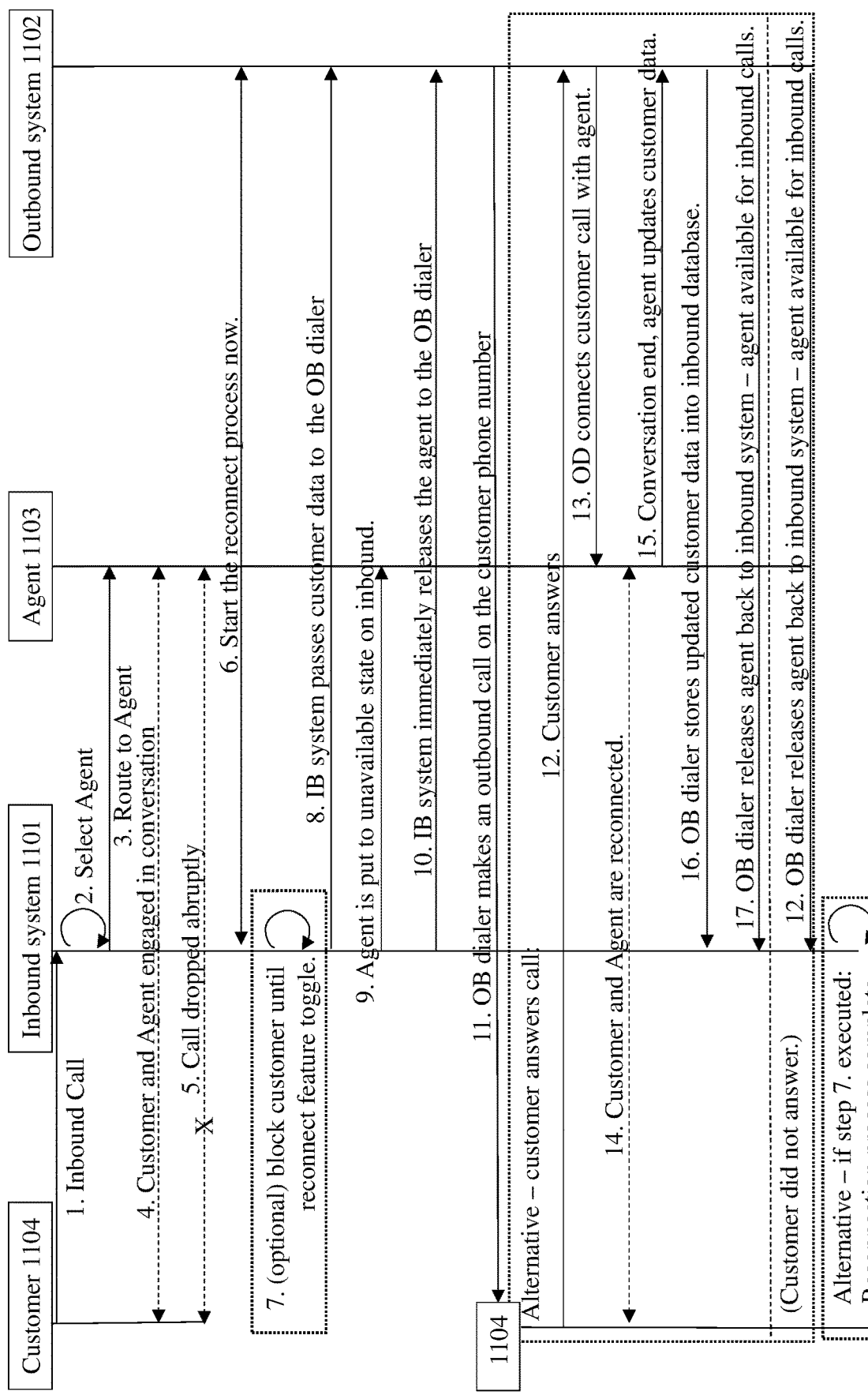
FIG. 11 is a sequence diagram and details steps for reestablishment of an interrupted connection between an agent device and a customer device, according to embodiments of the present invention.

FIG. 11 is a sequence diagram depicting a connection request, connection disconnect and reestablishment of the connection: A customer 1104 may start an inbound connection request, e.g. a call, (step 1) and may connect to inbound system 1101. Inbound system 1101 may select an agent (step 2). In an embodiment, an agent is available to receive a connection, e.g. a call, and the connection request is transmitted to the agent 1103 (step 3). Customer 1104 and agent 1103 may engage in a conversation (step 4). After a certain time period, a connection may be interrupted, e.g. a call ends abruptly. As detailed in FIG. 6, 7, or 8, any node can be the origin of the call drop. In the present example, it is assumed that the SIP connection may be disconnected between IP-IBX and VOIP Network and between Remote Service Provider and cellular tower leading to an interruption of the Voice RTP connection between customer device and agent device (step 5).

An inbound system, e.g. inbound system 106 disclosed in FIG. 1, may detect an interrupted connection between an agent device and a customer device and may start to reestablish an interrupted connection between an agent device and a customer device (step 6). Inbound software, e.g. inbound software 1001 of inbound system 1000 (as depicted in FIG. 10), may label the customer contact in the inbound database, e.g. inbound database 1005, with a flag that denotes that a reconnection attempt is in progress for the customer device of a customer. For example, such a flag may be 'reconnection_in_progress': 'Y'.

In some embodiments, a customer trying to reestablish an interrupted connection, e.g. by calling back the contact center during a certain time period, in which the outbound system, e.g. outbound system 104 disclosed in FIG. 1, may try to reestablish the interrupted connection and the customer device of the customer may be connected to the inbound system. However, the inbound system may recognize the customer device, e.g. by the telephone number provided to the inbound system upon connection of the call. Alternatively, customer 1104 may be identified by a match of contact data provided in a connection request with data stored on inbound database, e.g. inbound data base 1005 disclosed in FIG. 10. For example, a match of contact data of a connection request and data stored on an inbound database may be established by matching an account number, a social security number, a subscriber number or a credit card number etc.

Instead of the inbound system enabling a connection to another agent, the inbound system may provide a recorded IVR message to the customer informing the customer that the contact center is trying to reconnect the same agent that was connected to the customer before interruption of the call and the inbound system terminates the connection, e.g. a call (step 7). Termination of connection requests by the inbound system for the customer is important, since the reestablishment of a connection between agent device and customer device via the outbound system requires the customer device to be available to receive a connection request, e.g. by an outbound system.

For example, when customer data for customer 1104 is identified in an inbound database and the customer contact has previously been labelled as 'Y' for 'reconnection_in_progress', the customer trying to reconnect with inbound system 1101 is informed that the contact center is trying to reconnect the same agent 1103 that was connected to the customer before interruption of the call and inbound system 1101 terminates the connection instead.

Inbound system 1101 may transmit customer data for the customer device, e.g. customer phone number, to the outbound system 1102 (step 8). Inbound system 1101 may stop allocating incoming connection requests to the agent 1103 and labels agent 1103 as unavailable (step 9). A connection between agent 1103 to the outbound system 1102 may be established. (step 10).

Outbound system 1102 may attempt an outbound reconnection to the customer device of customer 1104 using a previously recorded customer phone number retrieved from an inbound database via inbound system 1101 and provided to outbound system 1102. For example, an outbound system may attempt an outbound call to establish a connection to the customer device for which an interrupted connection occurred, herein referred to as the primary phone. If no connection can be established, outbound system 1102 may attempt an outbound call on an alternative phone number recorded in data for customer 1104 and may attempt to establish a connection to customer 1104 contacting an alternative customer device (step 11).

If customer 1104 establishes a connection to the connection request from the outbound system 1102, e.g. by answering the outbound call attempt on the primary phone or one of the alternative phones (step 12), the outbound system may connect the customer call, e.g. customer voice call, with agent 1103 (step 13). At the same time, it provides agent 1103 with customer data for customer 1104, retrieved earlier from the inbound system at step 8 and displays retrieved customer data to the agent, e.g. on an CRM screen of an agent device (step 13). At this point, the connection between customer 1104 and agent 1103 via customer device and agent device may be reestablished and customer 1104 and agent 1103 may be engaged in conversation (step 14).

After the conversation ends, agent 1103 may record additions to the customer data of customer 1104 or may update customer data of customer 1104 based on their interaction with customer 1104 using the CRM interface and amended customer data is stored in the outbound calling list record for a customer contact (step 15). Agent 1103 may complete the customer record with a completion code which is also stored in the outbound calling list record for the customer contact. At this point, the outbound system stores updated data of the customer record for customer 1104 into the inbound database and inbound system 1101 is provided with latest data from the recent customer interaction (step 16).

The outbound dialer of outbound system 1102 may disconnect the connection to agent 1103 and agent 1103 may be reconnected to inbound system 1101. Inbound system 1101 may assign a new connection request to agent 1103, e.g. an inbound call (step 17). Alternatively, if the reconnection attempt to customer 1104 (step 12) was unsuccessful and no reconnection to customer 1104 could be achieved, inbound system 1101 may assign a new connection request to agent 1103 via inbound calls after step 12.

If customer 1104 was blocked from being connected to another agent by inbound system 1101 in step 7, inbound system 1101 may stop the instruction 'reconnection_in_progress' for customer 1104 and when customer 1104 calls the contact center at a later point in time, inbound system 1101 may allocate any agent to connect to a connection requested by customer 1104.

Figure 12A:
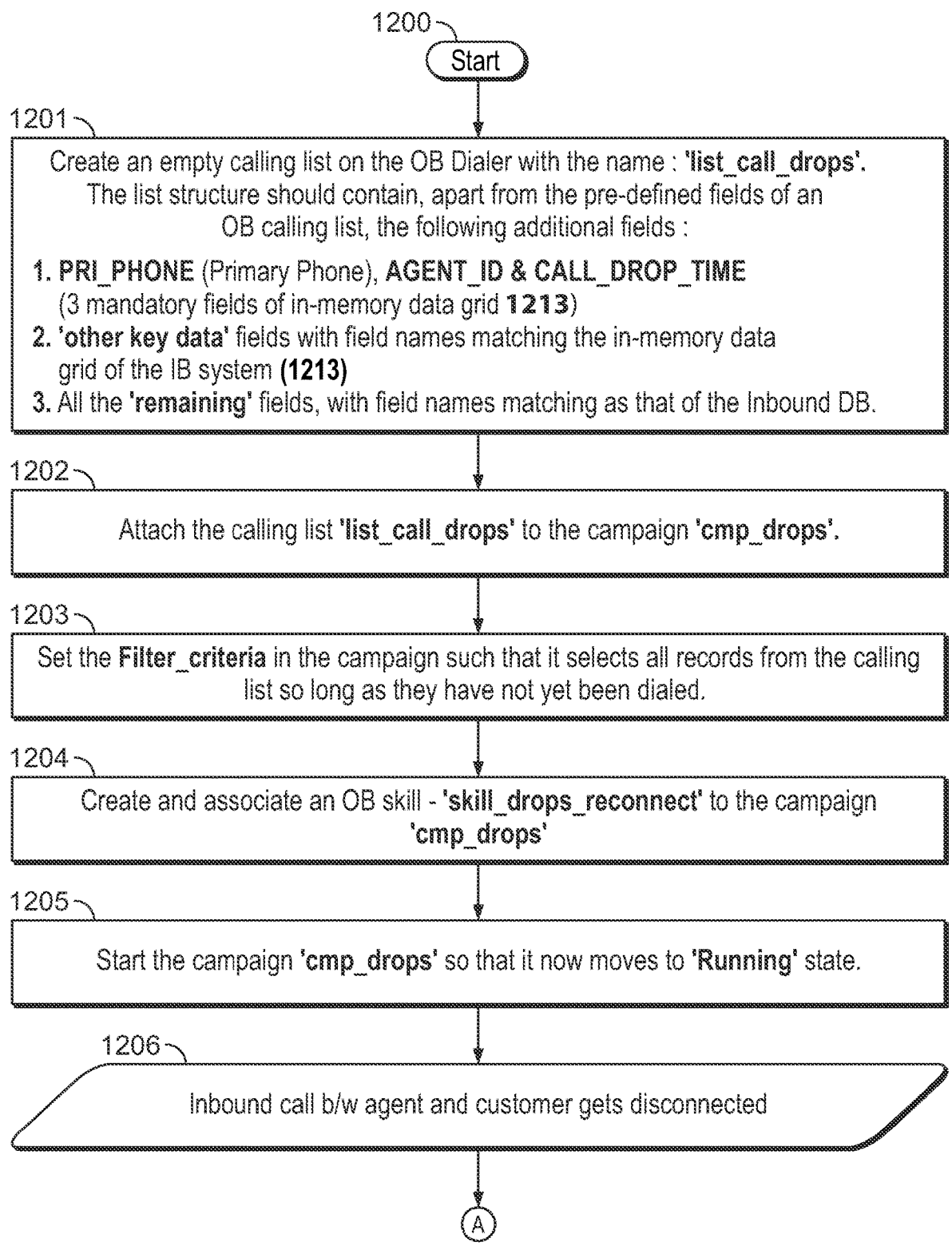
FIG. 12A is a flow chart detailing specific aspects of a method for reestablishing an interrupted connection between an agent device and a customer device, according to embodiments of the present invention.

FIG. 12A is a flowchart detailing specific aspects of a method for reestablishing an interrupted connection between devices (the example procedure using an agent device and a customer device; other devices may be used).

Data, e.g. customer data may be transferred between the inbound system and outbound system, e.g. inbound system 106 and outbound system 104 as depicted in FIG. 1, in form of Representational State Transfer (REST) calls using a REST application programming interface (API) that enables interaction between inbound system and outbound system.

An API may be a software interface that enables communication, e.g. in form of data transfer between inbound system 106 and outbound system 104.

A REST API is a web-service that enables access to web services using hypertext transfer protocol (HTTP) methods to enable a request, e.g. a request to transfer customer data, between an outbound system and an inbound system, via a network.

Requests may be sent from a client to a server in form of a web Uniform Resource Locator (URL) as a HTTP GET, POST, PUT or DELETE request. After that, a response may be received from a server in form of a resource, for example a resource in form of a data item such as HyperText Markup Language (HTML), extensible markup language (XML), Image, or JavaScript Object Notation (JSON).

An outbound system may be a server and an inbound system may be a client, e.g. to add, edit, update records to the outbound calling list. For example, a client such as an inbound system may use a REST API (web-service) to provide customer data to a server, e.g. a server of an outbound system. The outbound system may then process the request and may respond with a result of the REST API request.

Alternatively, an inbound system may be a server and an outbound system may be a client. In such a case, an outbound system may establish a REST API connection to the inbound system. An inbound system may thereby expose REST API connections. For example, an inbound system may expose a REST API connection to update customer data in the inbound database.

REST API connections (e.g. REST API calls) may be used by the inbound and outbound system, e.g. to process customer data: REST API connections may be used, for example, to create a contact list, edit a list, empty a list, delete a list, get list Id, search and sort a list, get a contact record from a list, edit a campaign, get campaign details, search a campaign, run a campaign, delete a campaign etc. The REST API may call to add a record to the list usually includes the list name along with some mandatory and optional fields. REST calls may exist not only for just adding record(s) to the list, but also for including the added record(s) into the running outbound campaign, which calls the contacts from the list.

As disclosed herein, when reference is made to the term "making a REST API call to add a contact record to the list", it is to be understood that both functions may occur through a single REST call, e.g., adding record to the list plus including the added record dynamically into the running campaign to which the list is attached.

These REST calls can typically be made via external tools, custom scripts or applications. In an embodiment, REST calls are made from the inbound system to add records to the calling list on the outbound system which is assigned for processing call drops (herein referred to as: 'list_call_drops'). This list may be kept attached to the campaign named 'cmp_drops', which dynamically picks up the newly added record(s), runs dynamic filtering on the record(s), and once the filter condition is passed, dials out the contact phone number of the record and presents to the agent.

An outbound campaign may be part of an outbound dialer that dials out customer calls. It is a system that comprises sub-components, for example contact list, skills, completion codes, filter criteria, reconnect to alternate phone attempts "Max_Alt_Attempts". A campaign may dial outbound phone numbers from each customer record of the contact list which matches the filter criteria and connect the answered customer connection, e.g. a phone call, to an agent device of an agent who is part of the skill associated with the campaign.

For example, a contact list may be a list that includes customer data for customers that is associated with a campaign "cmp_drops" and may include customers for which an abrupt interruption in a connection has been identified by the inbound system.

A filter criteria, e.g. 'Filter_1' may be used to filter a contact list for a defined parameter, e.g. a parameter present in customer data. For example, for reestablishing an interrupted connection after a call interruption, a filter may have the condition to filter customer contact records with "completion code" field having an empty value. An empty value for a field "completion code" within an entry for a customer connect record may indicate that a reconnection attempt to a customer has not been attempted by the outbound system since the previous connection interruption.

Before the start of a campaign, the filter criteria of a campaign (e.g. Filter_1) may filter a contact list for customers whose customer data matches the filter criteria. Customer records that match the filter criteria may form part of the outbound campaign for dialing. An outbound campaign may start attempting reconnection to customer devices based on customer contact records present in the filtered contact list, e.g. by establishing a telephone call to a customer device.

An outbound system may attempt a connection to a customer in, for example a progressive/predictive dialing mode or a preview dialing mode:

In a progressive or predictive dialing mode of the outbound system, when a customer answers the connection request, e.g. a call request, a campaign may present customer data, related to the customer that answered the connection request, to an agent via the agent's CRM screen, e.g. of an agent computer desktop 108. At the same time, the outbound system may establish the connection between the customer voice of the customer and the agent voice of the agent.

Alternatively, in the preview dialing mode of the outbound system, customer data may be presented to an agent on a CRM screen, e.g. of an agent computer desktop 108, prior to a connection attempt to a customer device. After previewing the customer data, an agent can initiate dialing out to a customer (basic preview) or the outbound system can automatically dial a customer phone number related to a customer device after a configured time interval, e.g. 15 seconds (preview time). A preview dialing mode has the advantage that an agent may review customer data before the dial out to engage with a customer.

The inbound system may add customer data to the outbound list based on events which are explained in the flowchart. Steps 1201-1204 detail adjustments to an outbound and inbound system prior to the start of the reconnection of interrupted calls:

In step 1201, a dialer supervisor may pre-create and keep an 'empty' calling list for processing call drops.

An identifiable name can be given to the list, something like: 'list_call_drops'. The outbound calling list may contain all or a subset of the pre-defined fields of a typical outbound list. Some of these pre-defined fields can be selected/de-selected by the supervisor. Pre-defined fields are also called as system-defined fields and typically include phone number fields, date and time fields for call attempt time, date and time fields for call completion time, Address 1, Address 2, email_id, Completion Code etc. Not all of the pre-defined fields are necessary to be contained in the list 'list_call_drops'. The main pre-defined fields necessary to be part of 'list_call_drops' would be the date and time fields depicting the call attempt and call completion times and the completion code field. Other predefined fields may be added or removed from the list structure. The list structure may contain, apart from the pre-defined fields above, 3 mandatory fields: PRI_PHONE (Primary Phone), AGENT_ID & CALL_DROP_TIME. The list structure may contain few other fields, referred in this implementation as 'other key data' fields. These may be the fields that were configured to be part of the in-memory data grid on the inbound system (with field names matching as that of the inbound system configuration). In-memory data grid may be explained in step 1213. The list structure may contain all the 'remaining' fields from the 'IB_contacts' table of the Inbound database. For example IB_contacts may be considered as the name given to the table in inbound database—which contains information of all inbound customer contacts.

In step 1202, an outbound campaign (for example named 'cmp_drops') may be pre-created for dialing-out recorded customers for which an interruption in a connection, e.g. a call drop, has been identified by the inbound system. The calling list, 'list_call_drops' (an empty list initially), may be attached to this outbound campaign 'cmp_drops', which may conduct calls from the list. Different outbound system products have different terminologies for the 'dialing out' component. As disclosed herein, the term 'campaign' is used as the dialing-out component which contains a calling list, runs filters on the calling list, dials phone numbers from each record in the calling list and attaches answered connection request, such as call requests, to agents.

In step 1203, filter criteria in the campaign may be configured to allow calling all records without any restrictions, so long as the record has not already been called. This can be easily achieved by checking the Last Attempt Time or the Completion Code fields of the record, if these fields are blank, then it is a new record which has not yet been dialed by an outbound dialer.

In step 1204, a dedicated outbound skill is pre-created and kept to process call drops (for example referred to as 'skill_drops_reconnect'). This skill may be associated to the campaign 'cmp_drops'. Agents devices whose inbound connections with customer devices are interrupted may dynamically be assigned this skill when they establish a connection to the outbound dialer for a reconnection attempt.

In step 1205, the campaign 'cmp_drops' may be started and is in the 'running' state. In subsequent steps, the campaign may always be kept in 'running' state. Some outbound dialers may refer to campaigns which are always running as 'infinite' campaigns and have a specific toggle field to set the campaign as infinite. Similarly, 'cmp_drops' may be setup as an always running campaign on the outbound system, with the calling list 'list_call_drops' attached to it and the skill 'skill_drops_reconnect' associated with it.

In step 1206, for an inbound call on which agent was connected with the customer, the inbound system may check for an inbound call disconnected event.

In step 1207, an inbound system may check if the disconnected inbound call is an abrupt call interruption. A call interruption may be detected by a method as known in the art and may be attached or integrated as a plugin to the inbound system. Upon an inbound call disconnect (1206), inbound system (1207) may identify whether or not the disconnect was an abrupt call interruption (1208). If no abrupt call interruption was identified, the disconnected inbound call may be considered normal or mutual between the agent and customer and no reconnection attempt would be initiated by the inbound system (1209).

Detection of a disconnection of a connection between customer devices and agent devices may be carried out by a method as known in the art: Inbound call requests from customer devices, e.g. customer device 570 and the connection between customer device, e.g. customer mobile device 570, and agent device, e.g. agent IP endpoint 508, may be monitored, to identify an interruption of a connection between a customer device and an agent device, e.g. due to cellular cut-off, such as network coverage limitations. Typically, an interrupted connection is identified by monitoring a defined period of time in which an agent device is still connected to the inbound system when a customer device has already disconnected from the inbound system. If an agent device does not disconnect a call within a certain period of time after the disconnection of the customer device, an interrupted connection between customer device and agent device may be identified as described herein. Alternatively, if a customer device does not disconnect a call within a certain period of time after the disconnection of the agent device, an interrupted connection between customer device and agent device may be identified as outlined below.

Detection of a disconnection of a connection between customer devices, e.g. customer device 570, and agent devices, e.g. agent device 508, may further be improved as detailed below:

In the prior art, the detection of a disconnection of a connection between customer devices and agent devices may be carried out using speech recognition. For example, speech enabled systems may detect an interrupted call by using speech recognition algorithms. Speech recognition algorithms may detect specific words in the conversation between agent and customer, e.g. "bye" or "good-bye" which precede the called or calling party connection being dropped. If these words have not been detected by speech recognition algorithms, an abrupt disconnection may be identified between an agent device and a customer device.

Alternatively, customer's closing remarks may be recorded, for example in previous connections between customer devices and agent devices, using speech recognition algorithms and stored in a database. Detection of closing remarks by a customer transmitted via customer device in subsequent connections between customer devices and agent devices and comparing the detected closing remarks with closing remarks stored in a database may allow a system to identify a planned or intentional disconnection between a customer device and an agent device and an abrupt disconnection between a customer device and an agent device.

A disconnection of a customer agent connection may be detected by the system by identifying a cause indicator including disconnect cause codes from SIP trunk, e.g. SIP trunk 414. Thereby, after a connection interruption, a system may receive a cause indicator in form of an identification number and a release message associated with the interrupted connection between a customer device and an agent device, e.g. an interrupted call from an SIP trunk, e.g. SIP trunk 414. The cause-indicator may be used to determine if the call disconnect was an abrupt call drop. Cause codes in release message may be SIP disconnect cause codes or reason codes that are sent by a service provider, e.g. a service provider of VOIP Network 1 420 after a call disconnect. On the other hand, if the service provider uses an Integrated Services Digital Network (ISDN) protocol for the establishment of connections between customer devices and agent devices, ISDN disconnect cause codes may be evaluated by the system. Cause codes are in hexadecimal format for ISDN, while for SIP over VOIP, they are in string format, containing an integer along with few keywords indicative of the disconnect reason.

Embodiments of the present invention may use one or more methodologies disclosed in the prior art for the detection of an interrupted connection, e.g. as part of the inbound system. The teaching of the prior art may either be implemented within the inbound system or as a plugin which is connected to the inbound system.

An inbound system, e.g. inbound system 106, may be configured to identify a period in which an agent device has not disconnected a connection between an agent device and an inbound device after disconnection between an inbound device and a customer device. An inbound system 106 may be configured to detect an interrupted connection between an agent device and a customer device via speech recognition and may be configured to store and retrieve speech recordings part of customer data and stored on a database, e.g. database 1005. In an embodiment, connection interruptions may be identified by software such as an inbound system box that is configured to analyze customer data, provided by the inbound system and a database, e.g. database 1005 and may identify an interrupted connection between a customer device and an agent device.

In step 1210, if an inbound system has identified an interrupted connection, the inbound system may check for a feature toggle: an inbound system may prevent the customer phone line from being engaged with the contact center again until a reconnect is attempted by the outbound system by carrying out the function 'block_customer_until_reconnect'. If a customer attempts to restore an interrupted connection after an interrupted call by a callback to the contact center, the inbound system may block a connection request by a customer device to a wait queue or to a randomly assigned agent. Instead, the outbound dialer of the outbound system may attempt a reconnection to the customer and preferably assign the same agent to the customer that was connected to the customer before the call drop. Thus, the reconnect attempt may only be successful if the customer phone line is available to receive a connection request (at least the reconnect attempt on the Primary Phone).

In step 1211, an outbound system may initiate the step 'play_IVR_&_hangup'. If the toggle feature 'block_customer_until_reconnect' (step 1210) is enabled, and if the customer attempts a reconnection, e.g. a call back, the inbound system may establish a connection to the customer device, and provide the customer device with a brief IVR message informing the customer that they will shortly receive a connection request, e.g. a call back, from an agent and terminate the connection to keep the customer system available to receive a reconnection request from the outbound dialer.

In step 1212, an inbound system may identify the agent that was connected to the customer prior to the connection interruption and places the agent into the state 'unavailable' for inbound connection requests so one user (e.g. an agent) does not receive any further incoming connection requests (e.g. inbound calls) received at the inbound system.

In step 1213, an inbound system may include an in-memory data grid. An inbound system may store customer data related to a customer whose connection with an agent was interrupted, e.g. in an abrupt call drop. The advantage of using an in-memory data grid is a high speed for customer data transfer to an outbound system in case of an interrupted connection. An inbound system may be configured to transmit customer data recorded for a customer into an in-memory grid upon an interruption of a connection. At least 3 fields may be transmitted to the in-memory data grid: PRI_PHONE (Primary Phone Number), AGENT_ID & CALL_DROP_TIME. These three fields may be regarded as 'mandatory' fields. While certain specific details are described as example data, and example user (e.g. customer) data, other data may be used.

PRI_PHONE (Primary Phone): A phone number on which the customer had established a connection to the contact center. The phone number may be referred to as the Primary number. The number can be extracted by the inbound system using the ANI (Automatic Number Identification) of the incoming call. ANI may identify the source phone number of an incoming connection request, e.g. customer call.

AGENT_ID: An AGENT_ID is a unique identifier of the agent to which a customer was connected to before the connection interrupted, e.g. in form of a phone conversation. An inbound system may identify the agent the customer was connected to before the interruption of the connection, since the incoming connection request from a customer may have been routed to an agent through its Inbound ACD (Automatic Call Distribution i.e. call routing) module. An Inbound ACD module may maintain the device-to-device (e.g. agent device to customer device) mapping in its memory throughout the duration of the call. Also, an inbound system may store details of the connection e.g. call record, along with the AGENT_ID into the inbound database, as soon as a connection request is accepted by an agent. Therefore, in the event of a connection interruption, an inbound system may be able to retrieve and provide the AGENT_ID for the agent of the interrupted connection to the outbound system.

CALL_DROP_TIME: A CALL_DROP_TIME is the time when the connected inbound connection (e.g. call) between the devices (e.g. customer device and agent device) was interrupted. An inbound system may record the exact time when the call dropped, since its ACD module or an associated module normally keeps this information in its cache and may provide the call drop time to the inbound database. An inbound system may save the call drop time with the accuracy of up to milliseconds (for example, it could save the call drop time in the format: dd:mm:yyyy:HH:MM:SS:ms).

In addition, the data grid can also be configured to hold one or more key fields that can be referred to as 'other_key_data' fields. The 'other_key_data' fields can be made configurable for the business need. The data grid ('other_key_data' fields) may be configured to include an alternative phone number. An alternative phone number for an alternative customer device may be beneficial in the reconnection of an interrupted connection to a customer, e.g. in the case when the customer is not available on his primary phone. The outbound dialer may be configured to establish a connection to the customer using an alternative phone number.

Other fields that can be part of the 'other_key_data' may include Customer Name, Account No, SSN No (Social Security Number), Credit Card No, Balance, contextual data, e.g. comments or notes written by the agent pertaining to the recent customer interaction.

The number of 'other_key_data' fields for a data grid may be for example between 7-8 fields providing for a data grid of 10-11 fields when including the three mandatory fields PRI_PHONE, AGENT_ID and CALL_DROP_TIME. To increase the efficiency and provide a quick data transfer between inbound system and the data grid, the amount of customer data stored in the data grid in in-memory may be kept as small as possible and, thus, the data grid should be configured not to include a large number of data fields.

An inbound system may have been provided with customer data, e.g. for fields of the data grid such as 'other_key_data' if the customer provides details on the IVR or mentioned these details by voice (in-cases where the IVR is integrated with speech recognition software) prior to a connection to an agent device. In most contact centers, entering such important details on the IVR is necessary before the call is routed to an agent. If a customer data of a customer relates to an existing customer, an inbound system may match details received by a customer via IVR with customer data stored in an inbound database. An agent may be provided with customer data on a CRM screen retrieved from an inbound database. A customer may also provide customer data, e.g. updates based on previously recorded customer data that may be stored in the inbound database after connection to an agent. In general, the inbound system may access customer data stored as part of 'other_key_data' in its inbound database for an interrupted connection. In addition, it may also periodically save customer data in the inbound database during a call.

In some cases, an inbound system may not have much or any data for the in-memory data grid, e.g. the in-memory data grid does not have data for 'other key data'. This may be possible if the customer was a first time caller and the business case for which he called did not require the provision of customer data on the IVR before getting connected to an agent. An in-memory grid, in this case, may still include the three mandatory fields that were transmitted by the inbound system as outlined before: PRI_PHONE, AGENT_ID and CALL_DROP_TIME, which can be used for a reconnect. Data structures other than an in-memory grid may also be used.

In the event of an interrupted connection between an agent device and a customer device (e.g. call drop), the inbound system may transmit data for the customer whose device is disconnected from the agent device into the in-memory data grid.

In 1214, once customer data for an interrupted connection is transmitted to an in-memory data grid, a Rest API call may be made by the inbound system based on this data to add the contact record of a customer into the appropriate outbound list 'list_call_drops'. Rest API call 'add' is the name given to a Rest call which can include a new contact record into the outbound calling list.

As explained, a Rest call may also dynamically include the added list record to the running campaign 'cmp_drops' to which the list is attached. A filter criteria of the campaign may select the added record and this contact record for a customer may now be eligible to get dialed-out from the campaign.

Step 1215 is executed in parallel at the time of the initiation of step 1214. Steps 1215-1218 may be considered as asynchronous steps. As part of 1215, an inbound system may check if the primary phone number of the dropped call matches a contact record in the inbound database. It carries out a search based on content of the primary phone field (or the corresponding field name given in inbound database for the customer's primary phone number) on all entries in the inbound database table. An inbound database table may include records of all customer contacts.

If a matching record is not found for a primary phone, an inbound system searches an inbound database using fields available as part of field for other_key_data that were stored in the in-memory data grid. For example—a search with Account No or SSN No may be made. A subset of 'other_key_data' fields of the in-memory grid may be used for searching the customer contact record in the inbound database, if the search for a customer contact record with primary phone number fails. The order of searches for a customer contact record based on the fields of customer data, e.g. other_key_data, may be amended by the inbound system. For example, it can be configured that if the search for a customer contact record with primary phone fails, a search for a record with an Account No. may be carried out, if a search for a record with an Account No. fails, a search for a social security number (SSN No.) may be carried out.

In step 1216, an inbound system may check if the customer record exists in the inbound database through the above mentioned searches. In step 1217, if a matching record for a customer is not found, the search in an inbound database is stopped. In step 1218, if a matching contact record is found in the Inbound database, an inbound system may gather data of all the remaining fields from the contact record stored in the inbound database. Remaining fields may be referred to as fields other than the fields Primary Phone, AGENT_ID, -CALL_DROP_TIME and fields including 'other key data' (Accnt No, SSN No etc.), for example, fields of the in-memory data grid structure.

After gathering data of the remaining fields from an inbound database, an inbound system may attempt another Rest API call which updates the customer record for a customer in the outbound list 'list_call_drops' for gathered data for remaining fields.

By this time, step 1214 may have been carried out by the inbound system and a contact record for a customer may have been added to the outbound list. Thereby, in step 1218, an existing contact record for a customer in the outbound list may be updated by the inbound system with additional data for the customer received from the inbound database by carrying out a rest API call with customer data found for all the remaining fields. Updated customer data may be part of the calling list record for a customer and may be available to an agent during the reconnection attempt.

During the conduction of steps 1215-1218, step '1214' may have been executed and the outbound system and inbound system may carryout step 1219 or one of the later steps.

In step 1219, an inbound system disconnects a connection with an agent device and the agent device may be connected to the outbound dialer of an outbound system. An outbound dialer may dynamically assign the agent to the particular outbound skill 'skill_drops_reconnect' configured for processing reconnects. As mentioned earlier in step 1204, this skill may have already been associated with the running campaign 'cmp_drops' for processing interrupted connections, e.g. call drops.

An agent device may be connected to the outbound system and may receive calls dialed-out from this outbound campaign 'cmp_drops'.

In step 1220, an outbound dialer campaign 'cmp_drops' may present a timed preview of the customer record to the agent device (e.g. on a CRM screen of an agent computer desktop 108), including customer data from the calling list record. In an embodiment, the feature timed preview is available on most outbound dialers where a preview of the customer contact is presented to the agent on his screen (i.e. CRM application screen), and the dial of the phone number by the outbound dialer is executed after the preview timer expires. For example, if the timed preview is set to 15 seconds, a dialer campaign executed by an outbound dialer may present the contact record to the agent for preview and initiate a dial of the corresponding phone number after 15 seconds. A preview may ensure that the agent is aware of the customer that is about to be contacted by giving him some buffer time to preview the customer contact on his screen.

An outbound calling list record containing customer data, e.g. customer data of the mandatory and other_key_data fields for a customer, may be created via Rest API as part of step 1214. Also, if data for a customer is found in an inbound database, then as part of steps 1215→1216→1218, the list record for the customer was also updated with additional/remaining fields. So, at step 1220 the outbound system may present the agent via agent device, e.g. on the CRM screen of an agent computer desktop 108 with a customer record for a customer previously updated via Rest API calls by the inbound system.

An outbound system may identify the agent for the preview of the connection request and the reconnection based on the AGENT_ID field of the calling list record.

In step 1221, an outbound dialer of an outbound system, using the campaign 'cmp_drops' may dial, after the preview timeout (timed preview e.g. in preview mode of dialing), the primary phone (PRI_PHONE) of the customer record of the customer (received via step 1214). The outbound system may then reconnect the interrupted connection between the agent device and the customer device, e.g. reconnection of the call audio to the agent as soon as ringing is detected.

In steps 1220 and 1221, alternatively, a 'progressive'/'predictive' dialing mode may also be used in the reconnection attempt. A dialer campaign can be setup to use the relevant dialing mode as per supervisor need. In a progressive/predictive mode, customer data is presented to an agent's CRM screen after the number is dialed and the customer answers the call.

In another environment, for the reconnect attempt of call drops, a preview mode of dialing with 'timed preview' feature is used.

In step 1222, an outbound system may identify if the customer was reachable on primary phone via a connection attempt, outlined in step 1221.

Embodiments may make use of alternate user devices. For example, in step 1223, in case a customer is not reachable on primary phone (for example, due to ringing timeout or telecom provider message such as "number not reachable" or any other reason), then an outbound dialer, using a campaign such as 'cmp_drops', may dial alternate phones in consecutive order (the order of alternate phones may depend on the number of alternative phone numbers available in the calling list record for the customer and how many are configured to be dialed in the campaign). Data, e.g. phone numbers, for the alternate phones may have been received by the inbound system in step 1214 or 1218 (via the Rest API calls (1214, 1218)) and may have been transmitted by the inbound system to the outbound system in outbound list 'list_call_drops'.

The number of alternate phones (ALT Phones) to call during a reconnect attempt may be configurable on the campaign by the outbound dialer of the outbound system by defining parameter 'Max_Alt_attempts' (operation 1227). For example, parameter 'Max_Alt_attempts' (1227) may be configured such that only two ALT Phone numbers be called in case of failure to reach the customer on previous numbers: for example, if an attempt to contact a customer using the PRI_PHONE fails→call ALT_PHONE1 and if attempt on this number fails→call ALT_PHONE2. (ALT_PHONE1 & ALT_PHONE2 are examples of field names given to alternate phones). In an embodiment, parameter 'Max_Alt_attempts' (operation 1227) may be configured such that an alternate phone is not called if the primary phone is not reachable.

In step 1228, if an outbound system can reestablish an interrupted connection between the agent device and the customer device via the primary phone (field name: PRI_PHONE) or one of the Alternate Phones of the customer, the agent may be reconnected and may re-engage in conversation with the customer.

In step 1229, if a customer is reachable, then, after the end of the conversation, the agent may record customer data based on the interaction with the customer using the agent device (e.g. using the CRM screen of an agent computer desktop 108) and complete the outbound call record with a completion code.

If a customer was not reachable, the agent may have the option to record customer data for the call attempt using the agent device (using the CRM screen of an agent computer desktop) and may complete the outbound call record with a completion code.

An outbound dialer may be configured to allow the agent to dispose the contact record with an appropriate completion code at the end of each call. The completion codes may be configured for connection campaigns, e.g. implemented by supervisors based on business need. Completion codes may summarize the result of the call in a keyword. For example, a customer originally called the contact center to report a problem to an agent and, upon a call drop, the outbound dialer may have reconnected with the customer. Thus, the completion codes that could be defined for the campaign 'cmp_drops' can be, for example: 'Billing_Concern', 'New_Card_Request', 'Product_Not_Working', 'General_Query', 'Customer_Not_Reachable'. The agent may label an appropriate completion code signaling the result of the call. If the agent connected and communicated with the customer, the completion code may signify the outcome of the conversation. Otherwise, if the customer is not reachable, the agent may mark some appropriate completion code like 'Customer_Not_Reachable'. Above completion codes are just examples. Depending on the operational needs, supervisors can configure other completion codes for the campaign.

In step 1230, at the end of the outbound call attempt, customer data recorded by an agent using an agent device (e.g. using the CRM screen of an agent computer desktop 108) and the completion code may be stored in the customer record of outbound calling list 'list_call_drops' by an outbound dialer. Customer data may be stored in the appropriate fields of an outbound list record for a customer contact.

In step 1231, an outbound dialer may synchronize updated data (through the reconnect attempt) of the customer record from the list with the inbound database. The synchronization may include transactional data that an agent recorded (e.g. using the CRM screen of an agent computer desktop 108) after the outbound call (reconnect attempt), including the completion code that the agent marked on the call. It can also include the time of the reconnect attempt by the outbound dialer and the time the agent marked the completion code. The synchronization may keep an inbound database updated based on the synchronization with the latest interaction status of the customer with the agent. This can also be used for reporting and analytics purposes.

In step 1232, an outbound dialer may disconnect the connection between outbound system and agent and the agent may be connected to the inbound system and may be made available to take connection requests, e.g. inbound calls.

In step 1233, an inbound system may check if the feature toggle 'block_customer_until_reconnect' was enabled (see step 1210). In step 1234, if step 1210 check for the toggle field was defined as 'yes' (if step 1211 was executed), then the inbound system may terminate the 'play_IVR_&_hangup' protocol and the customer previously interrupted from a connection to an agent and trying to call the contact center may now be connected via the normal inbound call routing process in subsequent inbound connection requests. Thereby, the inbound system may play the standard IVR wait-queue message (till an agent becomes available) or directly connect the customer to an agent (if an agent is already available).

In step 1235, reestablishment of an interrupted connection ends.

Figure 12B:
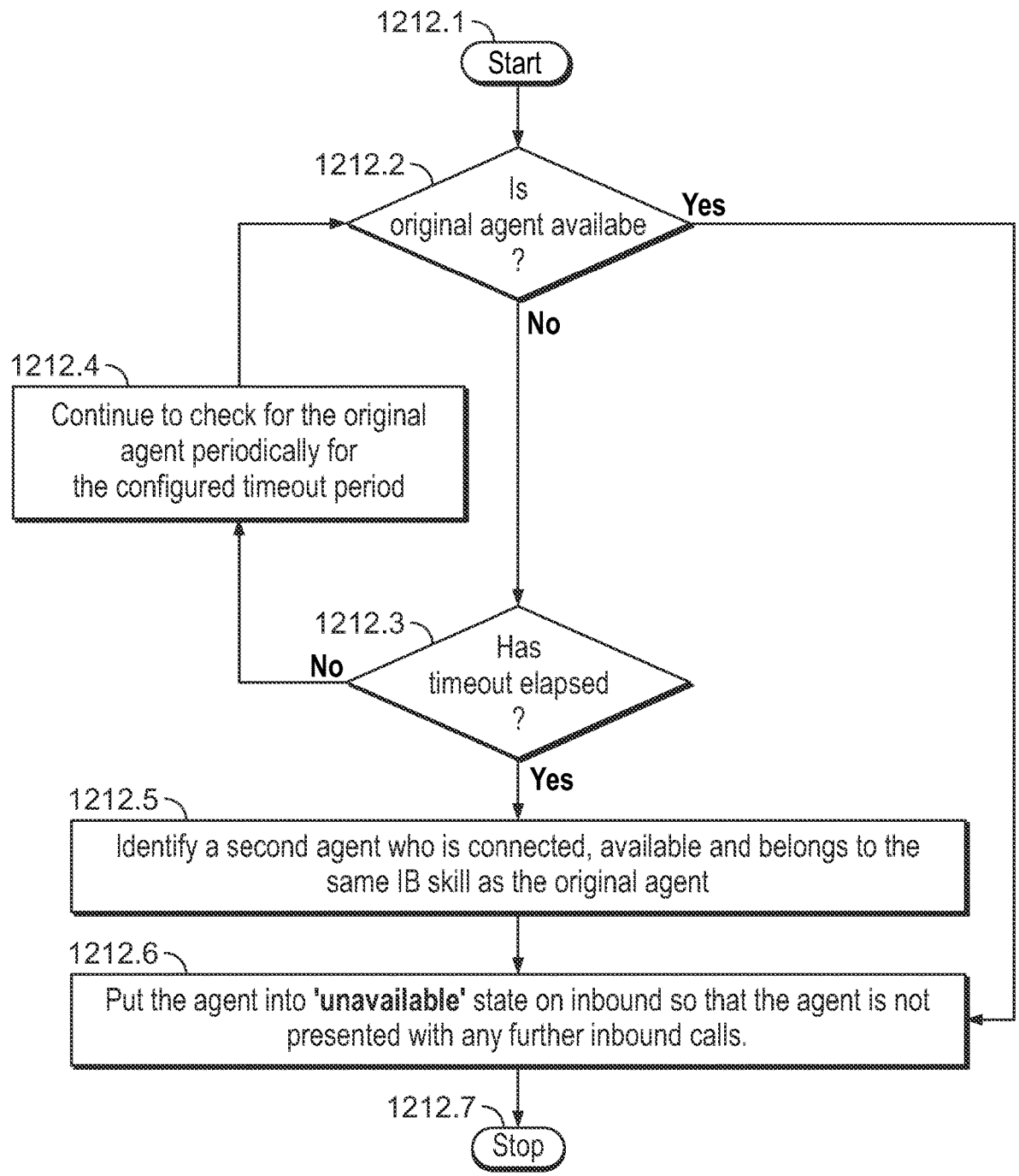
FIG. 12B is a flow chart detailing specific aspects of a method for reestablishing an interrupted connection between an agent device and a customer device.

FIG. 12B provides an example detailed illustration of step 1212 of FIG. 12A. FIG. 12B details an alternative pathway in the reconnection for the case when the agent, referred to as the original agent, whose connection to a customer was interrupted, is not available for a reconnection to the customer and a connection to an alternative agent, referred to as second agent, is established, according to embodiments of the present invention. In step 1212, an inbound system may identify an appropriate agent device, that has been interrupted in a connection with a customer device and record his status in the inbound system as unavailable so that the agent does not receive further inbound calls allocated by the inbound system.

FIG. 12B shows the sub-processing steps that may happen as part of 1212 in one embodiment.

In step 1212.2, an inbound system may identify if a user (e.g. an agent) whose call with another user (e.g. the customer) interrupted (this particular agent referred to as original agent) is still connected to a contact center and if the original agent is available. If yes, then step 1212.6 is executed by the inbound system.

In step 1212.3, an inbound system may periodically check if a configurable timeout period to connect to the original agent has elapsed. If the configurable timeout period has not elapsed, an inbound system may periodically attempt to identify if the original agent is available for a configurable period of time (in seconds) (1212.4). If the original agent is still not available after a configurable period of time, an inbound system may identify an alternative agent (1212.5). In some embodiments, an inbound system is configured to identify an alternative agent immediately, e.g. when the configurable period of time is set to 0. There can be cases where the original agent (who took the inbound call and whose call with the customer dropped) is not available, e.g. due to issues like desktop crash or softphone crash or an agent network went out of reach (possible if agent is working remotely).

In step 1212.5, an inbound system may identify an alternative agent who is available and has the same inbound skill as the original agent.

An inbound system may support skill-based connection of incoming connection requests, e.g. skill-based call routing. Skill-based call routing is a call-assignment strategy used in contact centers to assign incoming calls, e.g. from a customer device to the most suitable agent. Thereby, customers may be assigned to agents with the most relevant skills for handling their concerns. For example, if language is considered as a skill, then the inbound ACD module can be configured to create a skill called 'Language', including values such as 'German', 'Spanish', 'English', 'French'. English speaking customers may be connected to agents who have English speaking proficiency. Similarly, for Spanish and other languages.

The inbound ACD may include a list of agents along with their corresponding skills. The skills per agent may be configured using the inbound system, and may be configured by a dialer supervisor.

During an inbound connection request, e.g. a call received from a customer device, the inbound ACD may identify the customer's preferred language, e.g. by retrieving customer data from an inbound database, e.g. inbound database 1005 as shown in FIG. 10. Alternatively, a customer may provide customer data, e.g. a preferred language, to the inbound ACD during the connection request, e.g. by providing details to an IVR prior to the call connection. For example, if a customer using a customer device such as customer device 970 indicates during communication to an IVR that their preferred language is Spanish, an inbound ACD may connect the customer device of the call to a Spanish agent.

In another example, a connection between a customer device and an agent device may be established based on other skills, e.g. technical proficiency, customer handling capability, or customer experience.

A skill "Technical Proficiency" may have skill values: "High", "Medium", "Low". A level "Customer Handling capability" may have skill values: "1-10". A skill value of "1" may be the lowest low rating and a skill value of "10" may be the highest rating. A skill "Experience" may relate to experience in years of an agent in handling customer calls in contact centers and may have skill values between "1" and "15".

Agents skills may be configured by an inbound system, e.g. by a dialer supervisor. An inbound ACD may be configured to establish a connection between a customer device and an agent device based on multiple skills, e.g. to check for all skill matches before routing an inbound customer connection request to a suitable agent who matches all skills.

For example, an incoming customer call by a customer device may be connected to an agent device with the following skillset: Language: Spanish, Technical Proficiency: High, Customer Handling capability: 10, Experience: 2 yrs (min).

In step 1212.6, an agent or alternative agent may be classed as unavailable by an inbound system and is not presented with inbound calls. If the original agent is not available to be connected to the outbound dialer for reestablishing the interrupted connection, an alternative agent with the corresponding skill set, e.g. who speaks the same language, may be connected to the outbound dialer to attempt a reestablishment of a connection to a customer device. An advantage of identifying an alternative agent based on the skills to provided customer data in an attempted reconnection may be that the alternative agent is likely to manage and/or address customer's needs related to the reason for calling the contact center.

In step 1212.7: Stop here for this sub-process of flowchart FIG. 12B and all subsequent steps may continue from step 1213 of main flowchart FIG. 12A.

If the agent device that was connected to the customer device prior to the connection interruption is not available, and an alternative agent device is identified, an inbound system may carry out the following steps:

An inbound system may put the alternative agent into unavailable state for inbound connection requests, e.g. calls, so that this agent is not presented with any further inbound connection requests.

An in-memory data grid of an inbound system may have an alternative agent's identifier in the mandatory AGENT_ID parameter, and a Rest API may be executed by an inbound system to add the customer contact record on the outbound list 'list_call_drops' to amend the alternative agent ID in the AGENT_ID field.

An inbound system may immediately disconnect a connection to an alternative agent and an outbound dialer may establish a connection to the alternative agent and may execute the outbound skill & campaign that is associated with processing call drops. An alternative agent may now be connected to the outbound system.

An outbound dialer may identify an agent that may be connected to the reconnect connection (call) by the AGENT_ID parameter, which in this case it may be the agent identifier parameter for the alternative agent.

Figure 12C:
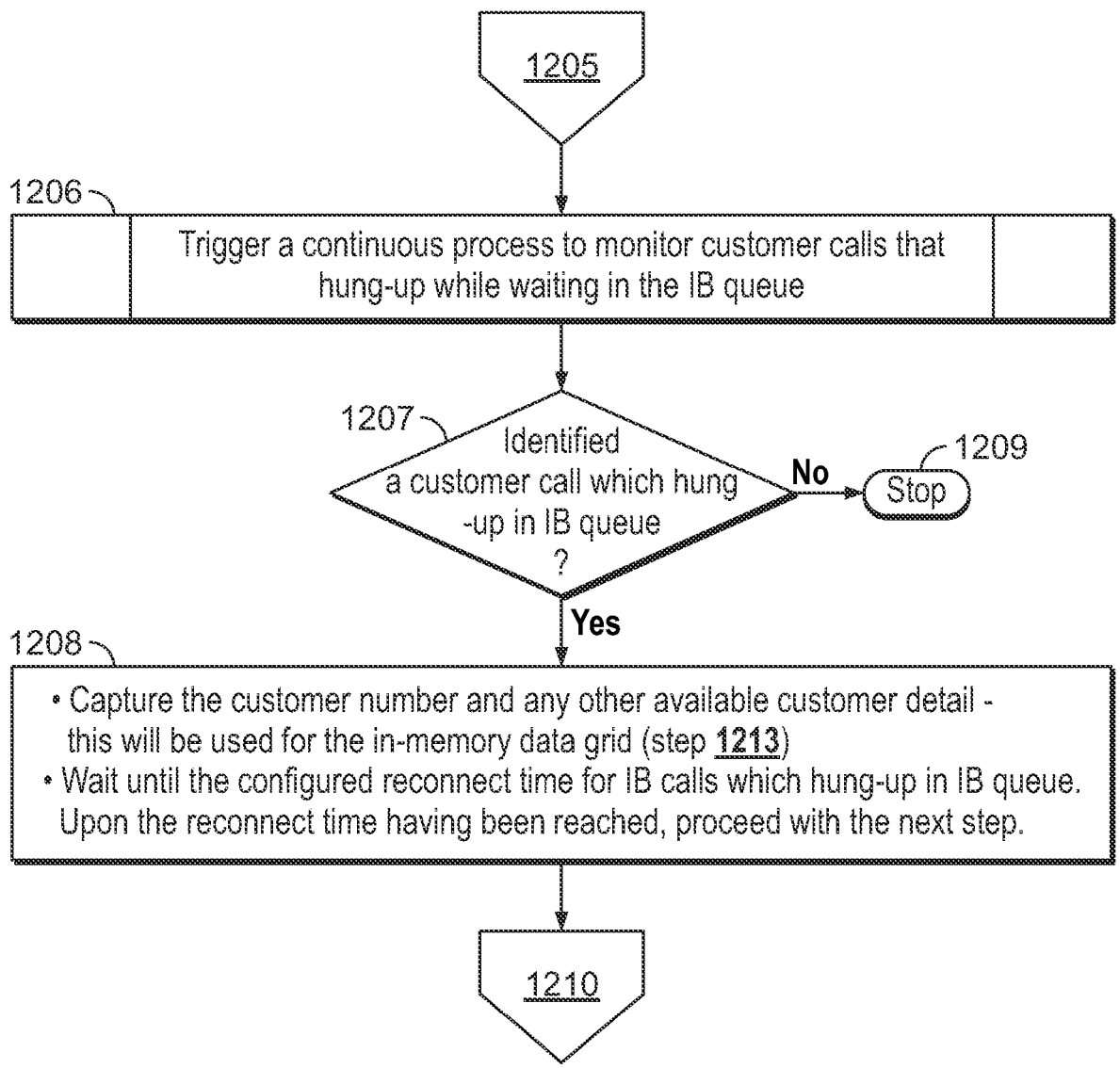
FIG. 12C is a flow chart detailing a use case in which an agent attempts a reconnection to a customer after a customer interrupted a connection attempt to an agent during the connection process, e.g. by hanging-up in wait-queue, according to embodiments of the present invention.

FIG. 12C is a flow chart detailing a use case in which an agent attempts a reconnection to a customer after a customer interrupted a connection attempt to an agent, e.g. agent 102, during the connection process. For example, in one example, a customer waited in a queue of calls to be processed by a contact center, e.g. contact center 100 and hung-up while still in queue. For the implementation of this use case, steps 1206 to 1208, 1210 and 1212 of FIG. 12A are modified as outlined below.

An agent connected to an inbound system, e.g. inbound system 106, may be available to reconnect to a customer whose connection attempt to an agent during the connection process was interrupted. Alternatively, an agent connected to an outbound system, e.g. an agent with relevant skills such as language skills that match the language of the customer, can attempt to reconnect to a customer. Accordingly, the process of identification of an appropriate agent may change in step 1212 to inbound and outbound connected agents.

Referring to step 1208 of FIG. 12C, a reconnect attempt may be initiated by an agent after a defined time period. For example, an inbound system, e.g. inbound system 106, may be configured to initiate a reconnect attempt after a connection attempt by a customer, e.g. an inbound call, was interrupted in the inbound queue after a defined time period. A time period may be set in the configuration 'timer' parameter for reconnecting such interrupted connection requests. A reconnection may be initiated only after a timer elapses.

For example, a parameter for reconnecting an interrupted connection request in the inbound queue may be named 'reconnect_call_hungup_in_IB_queue' and its timer is set to 120 seconds. A reconnect attempt would happen only 120 seconds after identification of an interrupted connection attempt, e.g. a hangup, is detected.

Connection requests that were interrupted during a connection attempt are connection attempts, e.g. missed calls, which could not reach an agent, since a customer did not talk to an agent before the establishment of a connection. Thus, there may not be business need to immediately reconnect an interrupted connection attempt, e.g. a call. Also, the approximate time period that one or more agent(s) with a certain skill would become available for a reconnection attempt has to be correctly anticipated by supervisors based on incoming connection requests, e.g. call volumes and priorities. The reconnect timer can, thus, be adjusted based on operational needs. If an immediate reconnect is needed, the reconnect timer can be configured as 0.

Inbound system feature 'block_customer_until_reconnect' (confer step 1210 in FIG. 12A) need not be enabled for this use case. After a disconnection during a connection attempt of a customer, e.g. a hang-up in wait-queue, if the customer tries to reach the contact center, e.g. contact center 100, again before the system attempts a reconnect, an inbound call request by a customer may be processed by the inbound system. In some embodiments, a reconnect may be attempted via an outbound dialer. In this case, an inbound system, e.g. inbound system 106, may not initiate a reconnect via an outbound dialer, e.g. of outbound system 104, if the customer called back after an interruption and has already been connected to an inbound agent.

Figure 12D:
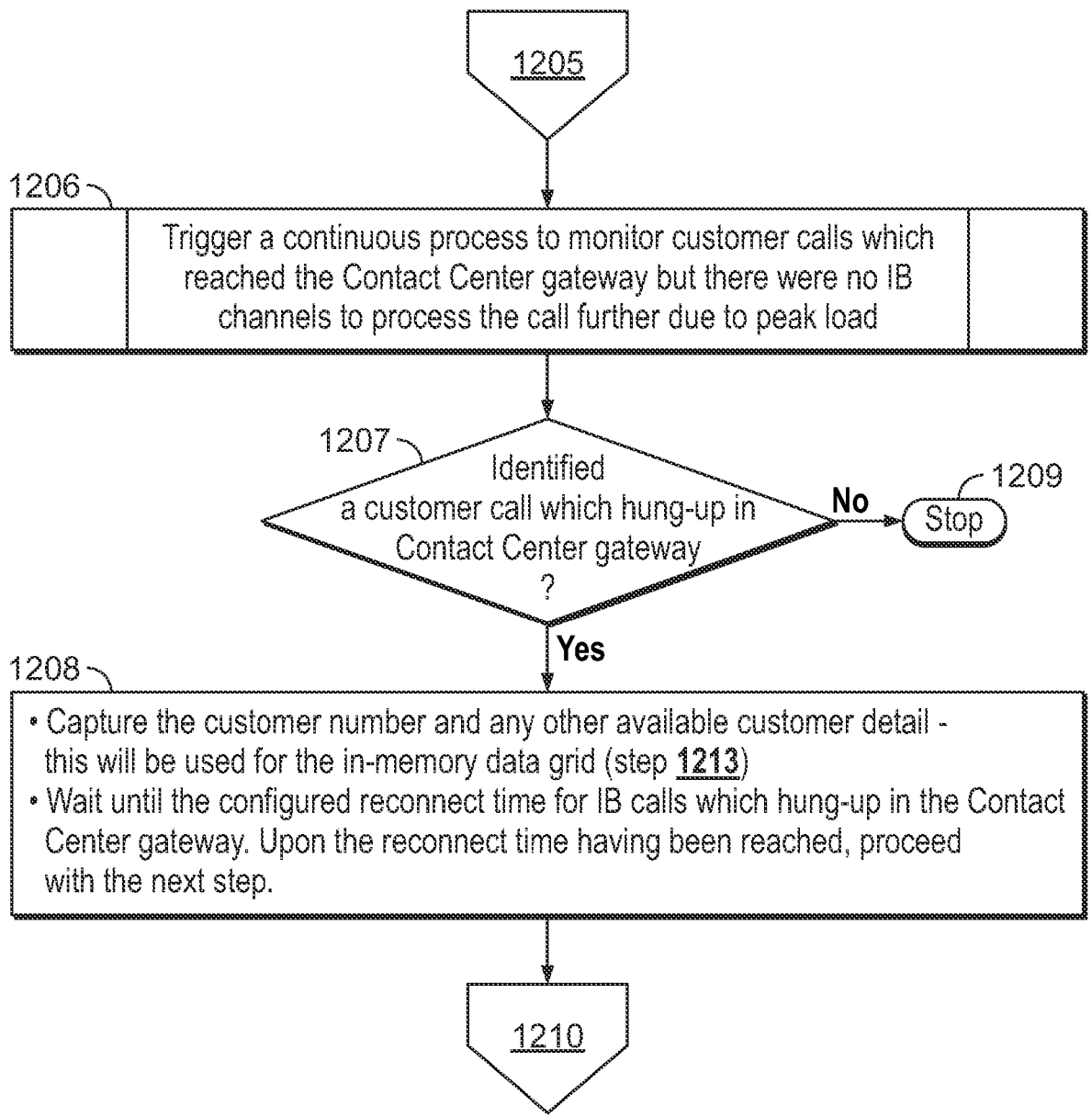
FIG. 12D is a flow chart detailing a use case in which an agent attempts a reconnection to a customer after a customer tried to establish a connection to an agent of a contact center but the connection was interrupted due to Contact Center call processing issues like, for example due to peak load, according to embodiments of the present invention.

FIG. 12D is a flow chart detailing a use case in which an agent attempts a reconnection to a customer after a customer tried to establish a connection to an agent of a contact center but interrupted the connection attempt to an agent during the connection process, since they did not receive a response from the IVR. This may occur, for example, if a customer heard dead-air on the call (e.g., no voice) and subsequently hung-up the call. For the implementation of this use case, steps 1206 to 1208, 1210 and 1212 of FIG. 12A are modified and outlined below.

A connection request by a customer, e.g. a phone call by a customer, may have reached a contact center gateway of a contact center (e.g. SBC—Session Border Controller), e.g. contact center 100, but may not have been connected to a voice channel (from the dedicated set of channels for inbound connection requests) on the contact center telephony server, e.g. due to peak load (occupation of all inbound channels). This type of problem can also happen if a portion of the telephony channels develop a fault or if a contact center experiences network issues.

An agent, e.g. agent 102, connected to an inbound system, e.g. inbound system 106, may be available to reconnect to a customer. Alternatively, an agent connected to an outbound system (e.g. outbound system 104), e.g. an agents with relevant skills such as language skills that match the language of the customer, can attempt to reconnect to a customer. Accordingly, the process of identification of an appropriate agent would change in step 1212 to inbound and outbound connected agents.

Also, referring to step 1208 of FIG. 12D, a reconnect attempt may be attempted by an agent after a defined time period. A time period may be set in the configuration 'timer' parameter for reconnecting such interrupted connection requests. A reconnect would be initiated only after a timer elapses.

For example, a parameter for reconnecting an interrupted connection requests in the inbound queue may be named as 'reconnect_call_hungup_in_gateway' and its timer is set to 240 seconds. A reconnect attempt would happen only 240 seconds after identification of an interrupted connection attempt, e.g. a hangup, is detected.

As in the use case disclosed in FIG. 12C, during the incoming connection request time and till the call was interrupted, an agent would not have been connected to the call, and it would have been like a missed call. Thus, there might not be a business need to immediately reconnect an interrupted connection attempt, e.g. a call. Also, the approximate time that one or more agent(s) with a suitable skill would become available for a reconnection attempt has to be correctly anticipated by supervisors based on incoming connection requests, e.g. call volumes and priorities. The reconnect timer can, thus, be adjusted based on operational needs. If an immediate reconnect is needed, then this reconnect timer can be configured as 0.

Inbound system feature 'block_customer_until_reconnect' (confer step 1210 in FIG. 12A) need not be enabled for this use case. As mentioned above, if, after a disconnection during a connection attempt of a customer, e.g. a hang-up due to the lack of an IVR message, a customer tries to reach the contact center, e.g. contact center 100, again before the system attempts a reconnect, the inbound call request by the customer may be processed as normal by an inbound system. In this case, an inbound system, e.g. inbound system 106, may not initiate a reconnect via an outbound dialer, e.g. of outbound system 104, if the customer called back after an interruption and has already been connected to an inbound agent.

Figure 12E:
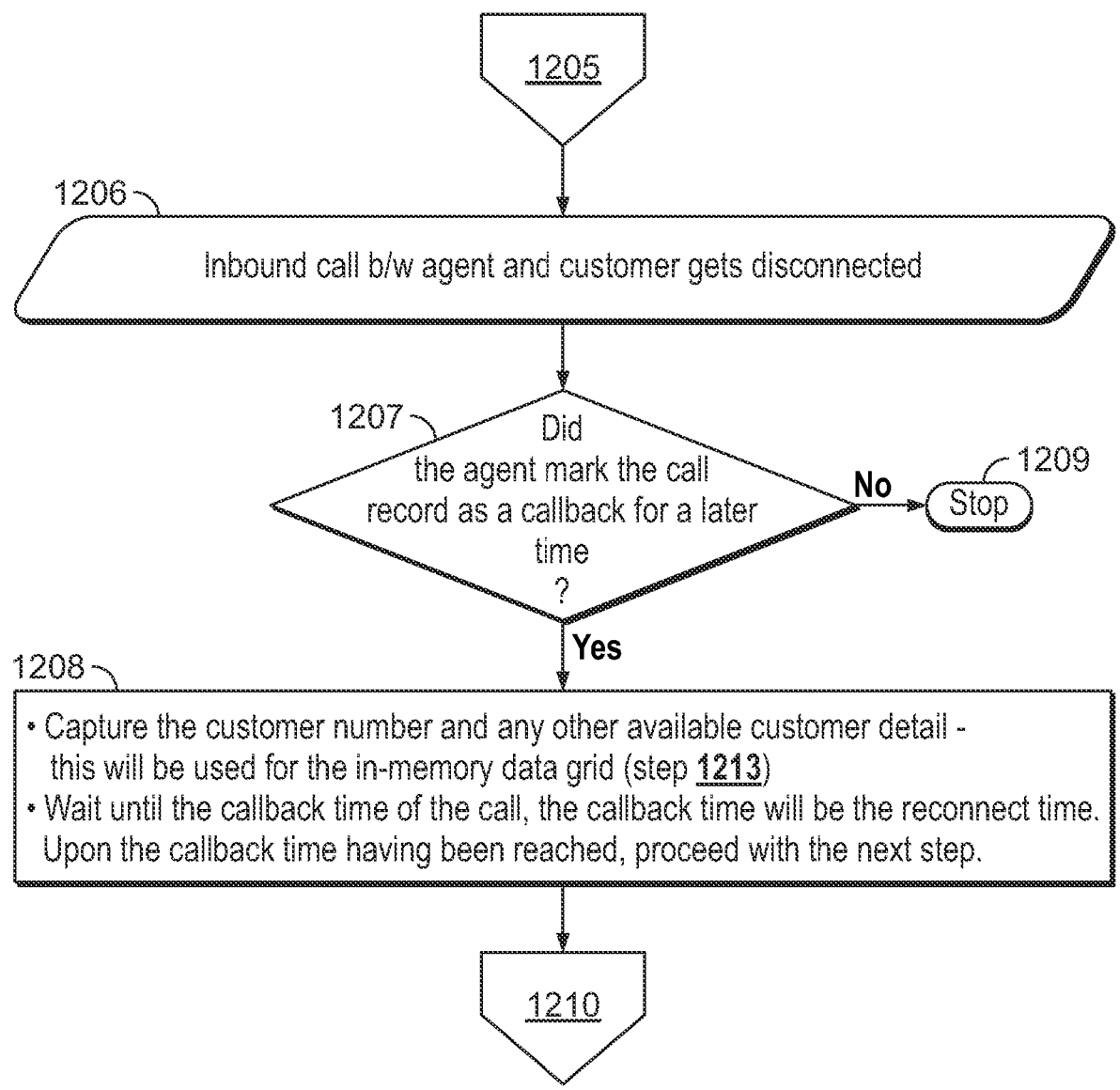
FIG. 12E is a flow chart detailing a use case in which an agent attempts a reconnection to a customer, e.g. a call back, after enquiring further details on a customer issue, according to embodiments of the present invention.

FIG. 12E is a flow chart detailing a use case in which an agent attempts a reconnection to a customer, e.g. a call back, after enquiring further details on a customer issue. In an alternative example, a customer may require a call-back from a supervisor or an agent with a different skill set after a certain time period. For the implementation of this use case, steps 1206 to 1208, 1210 and 1212 of FIG. 12A are modified and outlined below.

In the case of a reconnection attempt from an agent to a customer, e.g. a call-back, an original agent who arranged a reconnection attempt (call-back) would be a preferred agent for a reconnection attempt. If no preference for an agent for a reconnect attempt is needed, a call-back can be allocated by an inbound system to be handled by any agent. An agent may be provided with the option to define a preference for a call-back agent when completing customer data for a customer when connected via an incoming connection, e.g. an inbound call.

Alternatively, if a customer requests a call-back by a supervisor or another agent, an agent currently connected to the customer can provide a preference for a call-back agent, e.g. when completing the customer record for the customer. For example, an agent can define that a call-back (reconnect) needs to be handled by a supervisor. In this case, a supervisor identifier can be added to a dialer skill.

Accordingly, the process of identification of an appropriate agent (or supervisor) to initiate a reconnect to a customer can change step 1212.

In this case, an option would be provided to an agent to set a call-back time in a customer record for a customer while completing the inbound call. The outbound system, e.g. outbound system 104, may delay the reconnection attempt until the call-back time is reached and initiate a reconnect process via an outbound dialer as detailed in step 1208 of FIG. 12E.

Again, the 'block_customer_until_reconnect' feature need not be enabled for this use case. After a disconnection during a connection attempt of a customer, e.g. a hang-up after conversation with the agent, if the customer tries to reach the contact center, e.g. contact center 100, again before the system attempts a reconnect, e.g. during the callback time, the inbound call request by a customer may be processed by the inbound system.

Figure 13:
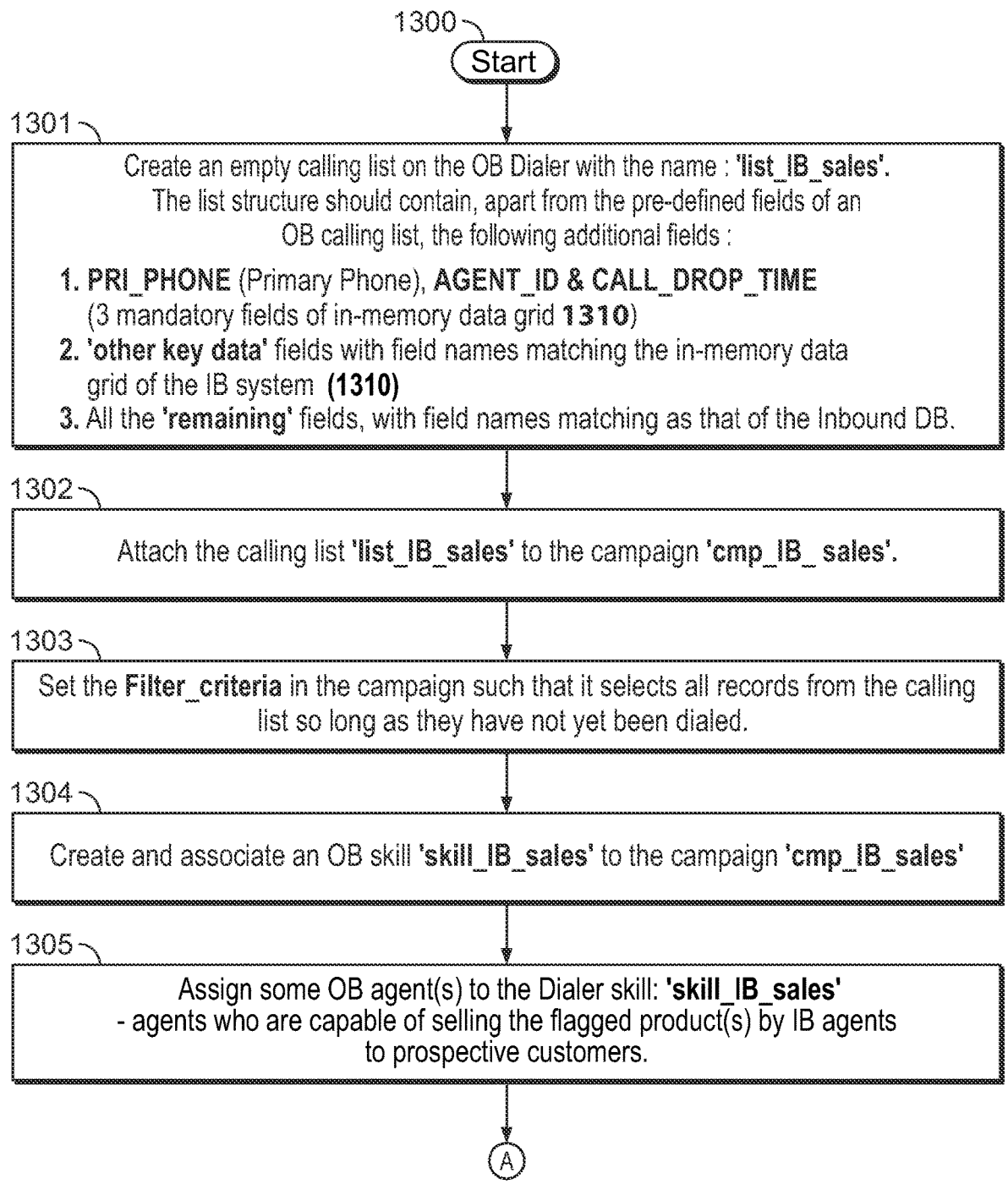
FIG. 13 is a flow chart detailing a use case in which an agent attempts a reconnection to an existing customer to deliver a sales pitch to an existing customer, according to embodiments of the present invention.

FIG. 13 shows a use case in which an agent may attempt a reconnection to an existing customer to deliver a sales pitch to an existing customer, who previously connected to a contact center. During an established inbound connection, e.g. an inbound call, an agent may indicate a customer as a prospect for sales, e.g. within customer data. An outbound dialer may generate a reconnection list based on customers that have been indicated as prospects for sales. FIG. 13 is a minorly amended version of FIG. 12A or the implementation of this use case, steps 1205, 1208 and 1211 of FIG. 12A are modified and outlined below.

A connection request to a customer, e.g. for a sales pitch, may be initiated by an agent connected to an outbound system, e.g. outbound system 104. Thus, a release of an agent, e.g. agent 102, connected to an inbound system, e.g. inbound system 106, to an outbound system may not be required. As disclosed in step 1305, agents connected to an outbound system can be kept assigned to an appropriate dialer skill for a reconnect attempt and can be used to engage in the reconnect process with customers to deliver a sales pitch (e.g. indication as a prospect for sales in customer data of a customer is checked in step 1308).

An embodiment may include a configuration timer to reconnect such calls. This timer can be called 'minimum_timer_before_reconnect' and is checked in step 1311. A reconnect would be initiated only after a timer elapses. A reconnect attempt can be initiated by the system e.g. via outbound dialer, after few minutes, hours or days in this use case. A timer can be configured by supervisors based on business need. Generally, there may not be a business need to immediately deliver a sales pitch to a prospective customer who connected to a contact center on an inbound call. However, if an immediate reconnection attempt by the system is needed, then the reconnect timer can be configured as 0.

Inbound system feature 'block_customer_until_reconnect' (confer step 1210 in FIG. 12A) need not be enabled for this use case. After a disconnection during a connection attempt of a customer, e.g. a hang-up after conversation with the agent, if the customer tries to reach the contact center, e.g. contact center 100, again before the system attempts a reconnect for a sales pitch, an inbound call request by the customer may be processed as normal by the inbound system.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What claimed is:

1. A method for reestablishing an interrupted connection between a first device and a second device, the method comprising:

detecting, by an inbound system, an interrupted connection between a first device and a second device;

transmitting, by the inbound system, data for the second device to an outbound system; and reconnecting, by the outbound system, the first device to the second device using the data.

2. A method according to claim 1, wherein the first device is an agent device and the second device is a customer device.

3. A method according to claim 1, comprising blocking the first device, by the inbound system, to receive incoming connection requests.

4. A method according to claim 1, comprising unblocking the first device, by the inbound system, to receive incoming connection requests.

5. A method according to claim 1, wherein reconnecting the first device to the second device comprises establishing a connection from the outbound system to the second device; and connecting the first device to the established connection to the second device.

6. A method according to claim 1, wherein reconnecting the first device to the second device comprises reconnecting the second device to an alternative first device, when the first device is unavailable.

7. A method according to claim 1, wherein the connection is interrupted by one or more of: first device, second device and intermediate node in a network.

8. A method according to claim 1, comprising providing the first device with data generated for the second device prior to the interrupted connection.

9. A method according to claim 1, wherein the transmitted data for the second device comprises data selected from a group consisting of customer name, customer phone number, agent identifier and drop time.

10. A method according to claim 1, wherein reconnecting comprises establishing a connection from the first device via the outbound system to an Internet Protocol private branch exchange that is connected via a service provider network to the second device.

11. A method according to claim 1, comprising blocking, by the inbound system, to receive incoming connection requests by the second device.

12. A method according to claim 1, wherein the outbound system reconnects the first device to an alternative second device when the reconnection to the second device is unsuccessful.

13. A method according to claim 1, wherein the interrupted connection is a voice call.

14. A system for reestablishing an interrupted connection between a first device and a second device, the system comprising:

a computing device;

a memory, configured to store data related to a second device; and a processor, the processor configured to:
detect an interrupted connection between a first device and the second device;
transmit data for the second device to an outbound system; and
reconnect the first device to the second device using the data.

15. A system according to claim 14, wherein the first device is an agent device and the second device is a customer device.

16. A system according to claim 14, wherein the processor is configured to block the first device to receive incoming connection requests.

17. A system according to claim 14, wherein the processor is configured to provide the first device with data generated for the second device prior to the interrupted connection.

18. A system according to claim 14, wherein the processor is configured to unblock the first device by an inbound system, to receive incoming connection requests.

19. A system according to claim 14, wherein the interrupted connection is a voice call.

20. A method for reconnecting a disconnected call between a computing device and a mobile device, the method comprising:

detecting, by a first software platform, a disconnected call between a computing device and a mobile device;

transmitting, by the first software platform, data for a connection request to the mobile device to a second software platform; and reconnecting, by a second software platform, the computing device to the mobile device using data for the connection request.

* * * * *